United States Patent
Zhang et al.

(10) Patent No.: US 12,408,125 B2
(45) Date of Patent: Sep. 2, 2025

(54) COMMUNICATIONS METHOD AND APPARATUS

(71) Applicant: Huawei Technologies Co., Ltd., Shenzhen (CN)

(72) Inventors: Di Zhang, Shenzhen (CN); Xu Zhang, Beijing (CN); Feng Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 334 days.

(21) Appl. No.: 17/809,792

(22) Filed: Jun. 29, 2022

(65) Prior Publication Data

US 2022/0338140 A1 Oct. 20, 2022

Related U.S. Application Data

(63) Continuation of application No. PCT/CN2019/130932, filed on Dec. 31, 2019.

(51) Int. Cl.
- *H04W 56/00* (2009.01)
- *H04W 72/0446* (2023.01)
- *H04W 72/0453* (2023.01)

(52) U.S. Cl.
CPC ..... *H04W 56/001* (2013.01); *H04W 72/0446* (2013.01); *H04W 72/0453* (2013.01)

(58) Field of Classification Search
CPC ..... H04L 5/001; H04L 5/0026; H04L 5/0048; H04L 5/0092; H04L 5/14; H04W 48/12; H04W 48/16; H04W 56/001; H04W 56/0015; H04W 72/0446; H04W 72/0453; H04W 72/23
See application file for complete search history.

(56) References Cited

U.S. PATENT DOCUMENTS

| | | | |
|---|---|---|---|
| 2019/0058538 A1 | 2/2019 | Sun et al. | |
| 2019/0069256 A1* | 2/2019 | Jung | H04W 56/0015 |
| 2020/0146041 A1* | 5/2020 | Kim | H04L 5/0048 |
| 2021/0092775 A1* | 3/2021 | Uchino | H04W 56/001 |
| 2022/0408491 A1* | 12/2022 | Liu | H04W 74/0833 |

FOREIGN PATENT DOCUMENTS

| | | |
|---|---|---|
| CN | 108810983 A | 11/2018 |
| CN | 109729586 A | 5/2019 |
| CN | 110601809 A | 12/2019 |
| JP | 2019004342 A | 1/2019 |
| WO | 2018128427 A1 | 7/2018 |
| WO | 2019047143 A1 | 3/2019 |

OTHER PUBLICATIONS

NTT Docomo Inc., "Remaining details on Synchronization signal", 3GPP TSG RAN WG1 Meeting #91, R1-1720789, Dec. 1, 2017, 5 pages.

Mediatek Inc., "Considerations on initial access and mobility for NR-U", 3GPP TSG RAN WG1 Meeting #93 R1-1806798, May 25, 2018, 3 pages.

* cited by examiner

*Primary Examiner* — Mansour Oveissi
(74) *Attorney, Agent, or Firm* — Slater Matsil, LLP

(57) ABSTRACT

A method includes: a network device sends a first synchronization signal/physical broadcast channel block on a first resource in resources corresponding to at least two candidate synchronization signal/physical broadcast channel blocks (SSBs), where the at least two candidate SSBs are respectively located at least two frequencies in a single serving cell or a single bandwidth part in a frequency division multiplexing manner; and the network device sends resource information of the first SSB.

23 Claims, 6 Drawing Sheets

COMMUNICATIONS METHOD AND APPARATUS

CROSS-REFERENCE TO RELATED APPLICATIONS

This application is a continuation of International Application No. PCT/CN2019/130932, filed on Dec. 31, 2019, the disclosure of which is hereby incorporated by reference in its entirety.

TECHNICAL FIELD

Embodiments of the present invention relate to the communications field, and more specifically, to a communications method and apparatus.

BACKGROUND

A downlink synchronization channel and a channel in a fifth-generation (5th Generation, 5G) mobile communications system include a plurality of synchronization signal/physical broadcast channel block (SSB) sets. The SSB set includes one or more SSBs. An SSB includes at least one of a primary synchronization signal (PSS), a secondary synchronization signal (SSS), and a physical broadcast channel (PBCH). When the SSB includes the PBCH, a physical resource block (PRB) in which each PBCH is located further includes a PBCH demodulation reference signal (DMRS). The SSB is mainly used for cell search, cell synchronization, and broadcast information or system information sending. In addition, the SSB may be further used for radio resource management (RRM) measurement and/or channel quality measurement. For example, channel quality measurement is measurement of layer 1-reference signal received power (L1-RSRP) and/or a layer 1-signal to interference plus noise ratio (L1-SINR) in a beam management process.

A terminal device needs to detect an SSB when accessing a network device. In one manner, the network device indicates an SSB index by using the PBCH DMRS or a master information block (MIB) message. Time-domain locations of SSBs are in a one-to-one correspondence with SSB indexes. Therefore, after detecting the SSB, the terminal device may determine, based on an SSB index corresponding to the SSB and an SSB set pattern of a current band, a slot and a symbol in which the current SSB is located, so as to complete slot-level synchronization. The SSB set pattern is predefined. An SSB set includes an SSB included in a half frame. In a serving cell or a bandwidth part (BWP), different SSBs are sent in a time division multiplexing (TDM) manner. SSB set patterns for different bands are different. When a band is less than 3 GHz, a maximum quantity of SSBs in an SSB set is Lmax=4; when a band is greater than 3 GHz and less than 6 GHz, a maximum quantity of SSBs in an SSB set is Lmax=8; or when a band is greater than 6 GHz, a maximum quantity of SSBs in an SSB set is Lmax=64. For different bands or subcarrier spacing, corresponding SSB set patterns are further defined in the 5G system. In the SSB set pattern, an index that is of the first symbol of a candidate SSB and that is in a half frame is shown below.

Case A in which subcarrier spacing is 15 kHz: The index of the first symbol of the candidate SSB is {2, 8}+14·n. When a band is less than or equal to 3 GHz, n=0, 1; or when a band is greater than 3 GHz and less than or equal to 6 GHz, n=0, 1, 2, 3.

Case B in which subcarrier spacing is 30 kHz: The index of the first symbol of the candidate SSB is {4, 8, 16, 20}+28·n. When a band is less than or equal to 3 GHz, n=0; or when a band is greater than 3 GHz and less than or equal to 6 GHz, n=0, 1.

Case C in which subcarrier spacing is 30 kHz: The index of the first symbol of the candidate SSB is {2, 8}+14·n. For a paired spectrum, when a band is less than or equal to 3 GHz, n=0, 1; or when a band is greater than 3 GHz and less than or equal to 6 GHz, n=0, 1, 2, 3. For a non-paired spectrum operation, when a band is less than or equal to 2.4 GHz, n=0, 1; or when a band is greater than 2.4 GHz and less than or equal to 6 GHz, n=0, 1, 2, 3.

Case D (case D) in which subcarrier spacing is 120 kHz: The index of the first symbol of the candidate SSB is {4, 8, 16, 20}+28·n. When a carrier frequency falls within FR2, n=0, 1, 2, 3, 5, 6, 7, 8, 10, 11, 12, 13, 15, 16, 17, 18.

Case E (case E) in which subcarrier spacing is 240 kHz: The index of the first symbol of the candidate SSB is {8, 12, 16, 20, 32, 36, 40, 44}+56·n. When a carrier frequency falls within FR2 n=0, 1, 2, 3, 5, 6, 7, 8.

That the carrier frequency falls within FR2 may be understood as that the carrier frequency is greater than 6 GHz.

It should be understood that in embodiments of this application, the "band" may be replaced with the "carrier frequency".

In another manner, the network device further indicates an index of an actually sent SSB by using system information block type 1 (system information block type 1, SIB1) signaling. The terminal device may perform rate matching and channel measurement based on the actually sent SSB, and receive system information based on the actually sent SSB. The SIB1 signaling indicates the actually sent SSB by using the following ssb-PositionsInBurst field:

```
ssb-PositionsInBurst    SEQUENCE {
inOneGroup   BIT STRING (SIZE (8)),
groupPresence   BIT STRING (SIZE (8)) OPTIONAL -- Cond FR2-Only
}
```

The groupPresence field in the ssb-PositionsInBurst field indicates whether each SSB group (group) includes a sent SSB. The first bit (namely, a leftmost bit) corresponds to SSB indexes 0 to 7, the second bit corresponds to SSB indexes 8 to 15, and so on. When a bit is 1, it indicates that SSBs corresponding to the SSB group are sent; or when a bit value is 0, it indicates that SSBs corresponding to the SSB group do not exist. The inOneGroup field indicates whether each SSB in each SSB group is sent. The first significant bit (namely, a leftmost significant bit) corresponds to an index of the first SSB in the SSB group (that is, the index corresponds to an SSB with a smallest index in a plurality of SSBs), the second bit corresponds to an index of the second SSB in the SSB group, and so on.

In another manner, the network device may further indicate a sent SSB (for example, during cell handover) by using radio resource control (RRC) signaling. The RRC signaling indicates the sent SSB by using the following ssb-PositionsInBurst field:

```
ssb-PositionsInBurst          CHOICE {
shortBitmap                   BIT STRING (SIZE (4)),
```

-continued

```
    mediumBitmap        BIT STRING (SIZE (8)),
    longBitmap          BIT STRING (SIZE (64))
}
```

The field indicates, by using a bitmap, a time-domain location of an SSB sent in a half frame. The first bit (a leftmost bit) corresponds to an SSB index 0, the second bit corresponds to an SSB index 1, and so on.

In another manner, the network device further indicates, by using RRC signaling, an SSB used for RRM measurement. The RRC signaling indicates, by using the following field, the SSB used for RRM measurement.

```
SSB-ToMeasure ::=   CHOICE {
    shortBitmap         BIT STRING (SIZE (4)),
    mediumBitmap        BIT STRING (SIZE (8)),
    longBitmap          BIT STRING (SIZE (64))
}
```

In another manner, the network device indicates, by using RRC signaling, indexes of M SSBs used for L1-RSRP measurement and/or L1-SINR measurement. The terminal device feeds back, based on a channel quality measurement result, indexes of N SSBs in the M SSBs and L1-RSRP and/or L1-SINRs respectively corresponding to the SSBs.

However, performance of a current manner of sending or detecting an SSB may be further improved.

SUMMARY

Embodiments of the present invention provide a communications method and apparatus, to provide a possibility of improving efficiency of sending and/or detecting an SSB.

According to a first aspect, a communications method is provided. The method may be performed by a network device, or may be performed by a chip in the network device. When the method is performed by the chip in the network device, a sending action may be understood as an output operation of the chip. Alternatively, when the method is performed by the network device, a sending action may be understood as a transmission operation performed by using a radio frequency channel. For ease of understanding, that the method is performed by the network device is used as an example for description herein. The method includes the following steps.

The network device sends a first synchronization signal/physical broadcast channel block on a first resource in resources corresponding to at least two candidate synchronization signal/physical broadcast channel blocks, where the at least two candidate synchronization signal/physical broadcast channel blocks are respectively located at least two frequencies in a single serving cell or a single bandwidth part in a frequency division multiplexing manner. Further, the network device sends resource information of the first synchronization signal/physical broadcast channel block.

According to a second aspect, a communications method is provided. The method may be performed by a terminal device, or may be performed by a chip in the terminal device. When the method is performed by the chip in the terminal device, a sending action may be understood as an output operation of the chip, and a receiving action may be understood as an input operation of the chip or may be understood as an action of performing demodulation by the chip to obtain data. Alternatively, when the method is performed by the terminal device, a sending action may be understood as a transmission operation performed by using a radio frequency channel, and a receiving action may be understood as an action of receiving a signal by using a radio frequency channel or may be understood as an action of performing demodulation by the terminal device to obtain data. For ease of understanding, that the method is performed by the terminal device is used as an example for description herein. The method includes the following steps.

The terminal device receives resource information of a first synchronization signal/physical broadcast channel block, where the first synchronization signal/physical broadcast channel block belongs to at least two candidate synchronization signal/physical broadcast channel blocks, and the at least two candidate synchronization signal/physical broadcast channel blocks are respectively located at least two frequencies in a single serving cell or a single bandwidth part in a frequency division multiplexing manner. Further, the terminal device determines a resource of the synchronization signal/physical broadcast channel block based on the resource information.

In the first aspect and the second aspect, there may be one or more first synchronization signal/physical broadcast channel blocks, that is, the first synchronization signal/physical broadcast channel block may be one or more of the at least two candidate synchronization signal/physical broadcast channel blocks. In this embodiment of the present invention, it is not unnecessarily to send the first synchronization signal/physical broadcast channel block on all of the at least two candidate synchronization signal/physical broadcast channel blocks. This embodiment is described for a specific first synchronization signal/physical broadcast channel block.

In the first aspect and the second aspect, there are at least two candidate synchronization signal/physical broadcast channel blocks (SSBs), and the two candidate synchronization signal/physical broadcast channel blocks are respectively located at least two frequencies in a single serving cell or a single bandwidth part in a frequency division multiplexing manner, to provide a possibility of sending a synchronization signal/physical broadcast channel block in a frequency division multiplexing manner. In this manner, efficiency of sending an SSB in frequency domain can be improved. Because a plurality of SSBs may exist in frequency domain, the terminal device may quickly receive the SSB in frequency domain, which provides a possibility for the terminal device to quickly detect the SSB.

In an optional implementation, the sending resource information of the first synchronization signal/physical broadcast channel block includes: sending the resource information of the first synchronization signal/physical broadcast channel block by using second indication information.

Correspondingly, the receiving resource information of a first synchronization signal/physical broadcast channel block includes: receiving the resource information of the first synchronization signal/physical broadcast channel block by using the second indication information.

The second indication information indicates a frequency-domain index, in a synchronization signal/physical broadcast channel block pattern, of the first synchronization signal/physical broadcast channel block associated with a system information block type 1 SIB1; or the second indication information indicates a frequency-domain index of the first synchronization signal/physical broadcast channel block.

Optionally, the first synchronization signal/physical broadcast channel block indicated by the second indication information is an initially accessed SSB.

Optionally, the second indication information is carried in the SIB1 or radio resource control RRC signaling.

Optionally, the frequency-domain index may be a relative frequency-domain location of the SSB in the SSB pattern.

In this optional embodiment, through the second indication information, the terminal device can obtain frequency-domain locations of at least two candidate SSBs based on a frequency-domain index of an SSB.

In an optional implementation, the sending resource information of the first synchronization signal/physical broadcast channel block includes: sending the resource information of the first synchronization signal/physical broadcast channel block by using third indication information. Correspondingly, the receiving resource information of a first synchronization signal/physical broadcast channel block includes: receiving the resource information of the first synchronization signal/physical broadcast channel block by using the third indication information.

The third indication information indicates a frequency-domain resource of the first synchronization signal/physical broadcast channel block in the at least two candidate synchronization signal/physical broadcast channel blocks.

Optionally, the third indication information is a bitmap, each bit of the bitmap corresponds to a candidate synchronization signal/physical broadcast channel block, and each bit is used to indicate whether to send the corresponding synchronization signal/physical broadcast channel block.

Optionally, the third indication information is carried in the SIB1 or RRC signaling.

Optionally, the second indication information and the third indication information both are carried in the SIB1 or RRC signaling.

If the second indication information and the third indication information both exist, an SSB indicated by the second indication information and an SSB indicated by the third indication information may not be completely the same. For example, the second indication information indicates a frequency-domain index of a currently accessed SSB; and the third indication information indicates one or more actually sent SSBs in the SSB pattern, where the one or more actually sent SSBs include an SSB other than the currently accessed SSB; or the third indication information indicates the currently accessed SSB and another actually sent SSB.

In this embodiment, the third indication information is used to indicate the frequency-domain index of the first SSB in the at least two candidate SSBs that is actually sent or indicate the first SSB in the at least two candidate SSBs that is actually sent, so that the terminal device can learn of a time-frequency resource of an actually sent SSB (or an actually existing SSB) based on the third indication information, and receive a system message in the actually existing SSB, measure channel quality on the time-frequency resource, or perform rate matching based on the actually existing SSB.

In an optional implementation, the communications method further includes: sending first indication information.

The first indication information is used to indicate to send a synchronization signal/physical broadcast channel block in a frequency division multiplexing manner; or the first indication information indicates a quantity of frequencies in the at least two frequencies; or the first indication information indicates the at least two frequencies; or the first indication information indicates a synchronization signal/physical broadcast channel block pattern.

In this embodiment, the first indication information is used to indicate a multiplexing manner of an SSB, indicate an SSB pattern, indicate a quantity of frequencies, or indicate a frequency, so that the terminal device can learn, based on the first indication information, that in addition to a currently accessed SSB or a detected SSB, another SSB may further exist in frequency domain. Therefore, the terminal device can simultaneously detect the SSB at a plurality of frequencies, thereby improving efficiency of detecting the SSB by the terminal device in frequency domain.

In an optional implementation, the method further includes: The network device receives channel state information, and correspondingly, the terminal device sends the channel state information.

The channel state information includes a time-domain index and a frequency-domain index of at least one synchronization signal/physical broadcast channel block in the at least two candidate synchronization signal/physical broadcast channel blocks, and/or includes channel quality information corresponding to at least one synchronization signal/physical broadcast channel block in the at least two candidate synchronization signal/physical broadcast channel blocks; or the channel state information includes an index of at least one synchronization signal/physical broadcast channel block in the at least two candidate synchronization signal/physical broadcast channel blocks.

Optionally, the index of the synchronization signal/physical broadcast channel block may be obtained by sorting a plurality of synchronization signal/physical broadcast channel blocks in the synchronization signal/physical broadcast channel block pattern in a manner of first time domain and then frequency domain; and certainly may be obtained in another manner, for example, a manner described in a specific implementation of the present invention.

In this embodiment, the network device may send a plurality of synchronization signal/physical broadcast channel blocks, and the plurality of synchronization signal/physical broadcast channel blocks include the first SSB. Further, another SSB included in the plurality of SSBs may be sent in an FDM manner with the first SSB, or may be sent in a TDM manner with the first SSB. This is not limited in this embodiment. The channel state information may include only a time-domain index and a frequency-domain index of at least one SSB in the plurality of synchronization signal/physical broadcast channel blocks or only an index of the at least one SSB. The time-domain index and the frequency-domain index of the at least one SSB or the index of the at least one SSB is used to indicate channel quality information of the at least one SSB. For example, the at least one SSB is at least one SSB that has relatively good channel quality and that is obtained by the terminal device by performing channel quality measurement at the plurality of SSBs, or is at least one SSB selected by the terminal device based on another rule. Optionally, the channel state information may further include channel quality information corresponding to the at least one synchronization signal/physical broadcast channel block.

In an optional implementation, the resource information of the first synchronization signal/physical broadcast channel block is a time-domain index and a frequency-domain index of the first synchronization signal/physical broadcast channel block; or the resource information of the first synchronization signal/physical broadcast channel block is an index of the first synchronization signal/physical broadcast channel block.

Optionally, the index of the first synchronization signal/physical broadcast channel block is obtained by sorting a plurality of synchronization signal/physical broadcast channel blocks in the synchronization signal/physical broadcast channel block pattern in a manner of first time domain and then frequency domain.

In an optional implementation, the sending resource information of the first synchronization signal/physical broadcast channel block includes: sending the time-domain index of the first synchronization signal/physical broadcast channel block by using a broadcast channel demodulation reference signal and/or a master information block. Correspondingly, the receiving resource information of a first synchronization signal/physical broadcast channel block includes: receiving the time-domain index of the first synchronization signal/physical broadcast channel block by using the broadcast channel demodulation reference signal and/or the master information block.

In this embodiment, only the time-domain index of the first synchronization signal/physical broadcast channel block is sent, and the frequency-domain index of the first synchronization signal/physical broadcast channel block is not sent, so that both a terminal device supporting an FDM SSB and an existing terminal device that does not support an FDM SSB can interpret the information to obtain a time-domain resource location, to access a network by using an FDM SSB to complete slot-level synchronization.

According to a third aspect, a communications apparatus is provided. The apparatus is a processing chip in a network device. A sending action may be understood as an output operation of the processing chip.

The apparatus includes a processor and an input/output interface. The processor is configured to read a program and execute the program. When the program is executed, operations in the first aspect and the optional implementations related to the first aspect are implemented.

Optionally, the apparatus may further include a memory, configured to store the program.

According to a fourth aspect, a communications apparatus is provided. The communications apparatus may be a network device, and the network device may include the communications apparatus according to the third aspect.

Further, the network device may include a processor, a memory, and a transceiver. The processor controls the transceiver to send and receive a signal. The memory is configured to store program code. The processor may control, by reading the program code, the transceiver to implement the foregoing method performed by the network device. Further, the transceiver is configured to send a first synchronization signal/physical broadcast channel block on resources corresponding to at least two candidate synchronization signal/physical broadcast channel blocks, where the at least two candidate synchronization signal/physical broadcast channel blocks are respectively located at least two frequencies in a single serving cell or a single bandwidth part in a frequency division multiplexing manner. Further, the transceiver is configured to send resource information of the first synchronization signal/physical broadcast channel block.

It may be understood that for corresponding descriptions and technical effects of the third aspect, the fourth aspect, and the optional implementations, refer to the descriptions of the first aspect and the second aspect. Details are not described herein again.

Optionally, the transceiver is configured to send the resource information of the first synchronization signal/physical broadcast channel block by using second indication information.

Optionally, the transceiver is configured to send the resource information of the first synchronization signal/physical broadcast channel block by using third indication information.

Optionally, the transceiver is configured to send the resource information of the first synchronization signal/physical broadcast channel block by using second indication information and third indication information.

Optionally, the transceiver is further configured to send first indication information.

Optionally, the transceiver is further configured to receive channel state information.

Optionally, the transceiver is configured to send a time-domain index of the first synchronization signal/physical broadcast channel block by using a broadcast channel demodulation reference signal and/or a master information block.

According to a fifth aspect, a communications apparatus is provided. The apparatus is a processing chip in a terminal device. A sending action may be understood as an output operation of the processing chip, and a receiving action may be understood as an operation in which the processing chip reads a channel through an input/output interface.

The apparatus includes a processor and an input/output interface. The processor is configured to read a program and execute the program. When the program is executed, operations in the first aspect and the optional implementations related to the first aspect are implemented.

Optionally, the apparatus may further include a memory, configured to store the program.

According to a sixth aspect, a communications apparatus is provided. The communications apparatus may be a terminal device, and the terminal device may include the communications apparatus according to the fifth aspect.

It may be understood that for corresponding descriptions and technical effects of the fifth aspect, the sixth aspect, and the optional implementations, refer to the descriptions of the first aspect and the second aspect. Details are not described herein again.

Further, the terminal device may include a processor, a memory, and a transceiver. The processor controls the transceiver to send and receive a signal. The memory is configured to store program code. The processor may control, by reading the program code, the transceiver to implement the foregoing method performed by the terminal device. Further, the transceiver is configured to receive resource information of a first synchronization signal/physical broadcast channel block, where the first synchronization signal/physical broadcast channel block belongs to at least two candidate synchronization signal/physical broadcast channel blocks, and the at least two candidate synchronization signal/physical broadcast channel blocks are respectively located at least two frequencies in a single serving cell or a single bandwidth part in a frequency division multiplexing manner.

The processor is configured to determine a resource of the synchronization signal/physical broadcast channel block based on the resource information.

Optionally, the processor may be further configured to receive the first synchronization signal/physical broadcast channel block or receive data based on the resource of the first synchronization signal/physical broadcast channel block. When the data is received, rate matching is performed based on the resource of the first synchronization signal/physical broadcast channel block.

Optionally, the transceiver is further configured to receive the resource information of the first synchronization signal/physical broadcast channel block by using second indication information.

Optionally, the transceiver is further configured to receive the resource information of the first synchronization signal/physical broadcast channel block by using third indication information.

Optionally, the transceiver is further configured to receive the resource information of the first synchronization signal/physical broadcast channel block by using second indication information and third indication information.

Optionally, the transceiver is further configured to receive first indication information.

Optionally, the transceiver is further configured to send channel state information. Optionally, the processor is configured to determine at least one of the synchronization signal/physical broadcast channel blocks.

Optionally, the transceiver is further configured to receive a time-domain index of the first synchronization signal/physical broadcast channel block by using a broadcast channel demodulation reference signal and/or a master information block.

Further, the foregoing aspects include the following optional implementations.

Optionally, time domain resources occupied by the at least two candidate synchronization signal/physical broadcast channel blocks completely or partially overlap.

Optionally, the at least two candidate synchronization signal/physical broadcast channel blocks have a same sending period; and/or the at least two candidate synchronization signal/physical broadcast channel blocks correspond to same subcarrier spacing.

Optionally, the at least two frequencies are located on a global synchronization channel number GSCN grid. This design enables both a terminal device supporting an FDM SSB and an existing terminal device that does not support an FDM SSB to access a network by using any SSB in FDM, without affecting access of the terminal device that does not support FDM.

Optionally, a frequency interval between the at least two frequencies is a predefined value; or information about a frequency interval between the at least two frequencies is sent by using first signaling.

Optionally, the first signaling is master information block signaling, system information block signaling, or radio resource control RRC signaling. For example, the first signaling may be the same as signaling in which the resource information is located.

Optionally, a minimum band of the single serving cell or a serving cell to which the bandwidth part belongs is an n79 band of 40 MHz; or in the single serving cell or a serving cell to which the bandwidth part belongs, a data channel has subcarrier spacing of 30 kHz and supports a minimum bandwidth of 10 MHz, synchronization signal/physical broadcast channel block subcarrier spacing is 15 kHz, and a band of the single serving cell or the serving cell to which the BWP belongs is one or more of n1, n2, n3, n5, n7, n8, n12, n14, n18, n20, n25, n28, n29, n30, n34, n38, n39, n40, n41, n48, n50, n65, n66, n70, n71, n74, n75, n77, n78, n80, n81, n82, n83, n84, n86, or n89; or in the single serving cell or a serving cell to which the bandwidth part belongs, a data channel has subcarrier spacing of 15 kHz and supports a minimum bandwidth of 10 MHz, synchronization signal/physical broadcast channel block subcarrier spacing is 15 kHz, and an applicable band is one or more of n41, n77, n78, or n90.

According to a seventh aspect, a communications apparatus is provided. The communications apparatus is configured to perform the foregoing method. These functions may be implemented by hardware, or may be implemented by hardware executing corresponding software. The hardware or the software includes one or more units, for example, a processing unit and a transceiver unit, corresponding to the foregoing functions.

According to an eighth aspect, a computer storage medium including instructions is provided. When the instructions are run on a computer, the computer performs the foregoing method.

According to a ninth aspect, a computer program product including instructions is provided. When the computer program product runs on a computer, the computer is enabled to perform the methods according to the foregoing aspects.

DETAILED DESCRIPTION OF ILLUSTRATIVE EMBODIMENTS

The following describes technical solutions in embodiments of the present invention with reference to the accompanying drawings in the embodiments of the present invention. In should be noted that the technical solutions and features in the embodiments of the present invention may be mutually combined in the case of no conflict.

In the embodiments of the present invention, "a/an" means an individual, and a quantity is not limited to only one. For example, in the embodiments of the present invention, "a terminal device" refers to a particular terminal device. This does not mean that "a terminal device" can be applied only to one particular terminal device, and a quantity of terminal devices is not limited to only one.

In the embodiments of this application, the terms "system" and "network" may be used interchangeably.

In the embodiments of this application, use of "an embodiment" (or "an implementation") or "embodiments" (or "implementations") means that a particular feature, structure, characteristic, and the like that are described in combination with an embodiment are included in at least one embodiment. Therefore, "in an embodiment" or "in the embodiments" that appears throughout this specification does not represent a same embodiment.

Further, in the embodiments of this application, the terms "and/or" and "at least one" used in the cases of "A and/or B" and "at least one of A and B" include any one of three solutions: a solution in which A is included but B is excluded, a solution in which B is included but A is excluded, and a solution in which both of the two options A and B are included. In another example, in the cases of "A, B, and/or C" and "at least one of A, B, and/or C", such terms include any one of six solutions: a solution in which A is included but B and C are excluded, a solution in which B is included but A and C are excluded, a solution in which C is included but A and B are excluded, a solution in which A and B are included but C is excluded, a solution in which B and C are included but A is excluded, a solution in which A and C are included but B is excluded, and a solution in which all the three options A, B and C are included. As easily understood by a person of ordinary skill in the art and a related art, all other similar descriptions can be understood in the foregoing manner in the embodiments of this application.

Figure 1:
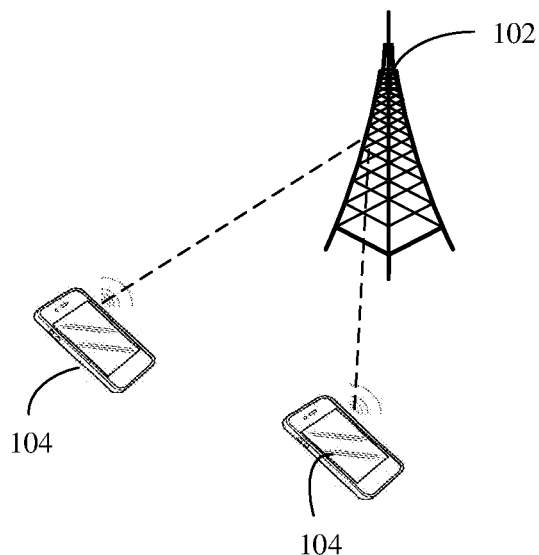
FIG. 1 is a schematic diagram of a wireless communications system to which an embodiment of the present invention is applicable.

FIG. 1 is a schematic diagram of communication between a wireless device and a wireless communications system. The wireless communications system may be a system using various radio access technologies (RAT) such as code division multiple access (CDMA), time division multiple access (TDMA), frequency division multiple access (FDMA), orthogonal frequency division multiple access (OFDMA), or single carrier frequency division multiple access (SC-FDMA), and another system. For example, the wireless communications system may be a long term evolution (LTE) system, a CDMA system, a wideband code division multiple access (WCDMA) system, a global system for mobile communications (GSM) system, a wireless local area network (WLAN) system, a 5G mobile communications system, various evolved or converged systems, and a system using a future-oriented communications technology. The 5G mobile communications system includes a non-standalone (NSA) 5G mobile communications system and/or a standalone (SA) 5G mobile communications system.

A system architecture and a service scenario that are described in the embodiments of the present invention are intended to describe the technical solutions in the embodiments of the present invention more clearly, and do not constitute a limitation on the technical solutions provided in the embodiments of the present invention. A person of ordinary skill in the art may know that with evolution of network architectures and emergence of new service scenarios, the technical solutions provided in the embodiments of the present invention are also applicable to similar technical problems.

For brevity, FIG. 1 shows communication between one network device (for example, an access network device) 102 and two wireless devices (for example, terminal devices) 104. Usually, the wireless communications system may include any quantity of network devices and terminal devices. The wireless communications system may further include one or more core network devices, a device configured to bear a virtualized network function, or the like. The access network device 102 may provide services for the wireless devices by using one or more carriers. In this application, the access network device and the terminal device are collectively referred to as a communications apparatus.

In this application, the access network device 102 is an apparatus that is deployed in a radio access network to provide a wireless communications function for the terminal devices. The access network device may include a macro base station (base station, BS), a micro base station (also referred to as a small cell), a relay station, an access point, a roadside unit of an intelligent connected vehicle, or the like in various forms. In systems that use different radio access technologies, a device that has a radio access function may have different names. For example, the device is referred to as an evolved NodeB (eNB or eNodeB) in an LTE system, or referred to as a NodeB in a 3rd generation (3G) system. For ease of description, in this application, the device that has a radio access function is referred to as an access network device, and is also referred to as a base station sometimes.

The wireless device in the embodiments of the present invention may include various handheld devices, vehicle-mounted devices, wearable devices, or computing devices that have a wireless communications function, or other processing devices connected to a wireless modem. The wireless device may be referred to as a terminal device, or may be referred to as a mobile station (MS), a terminal, user equipment (UE), or the like. The wireless device may include a subscriber unit, a cellular phone, a smartphone, a wireless data card, a personal digital assistant (PDA) computer, a tablet computer, a modem or a modem processor, a handheld device, a laptop computer, a netbook, a cordless phone or a wireless local loop (WLL) station, a Bluetooth device, a machine type communication (MTC) terminal, an on-board unit, and the like. The on-board unit may be a unit that can communicate with a device outside the vehicle, for example, a vehicle box or a vehicle gateway in the intelligent connected vehicle. For ease of description, in this application, these devices are briefly referred to as terminal devices or UE.

The wireless device may support one or more wireless technologies for wireless communication, such as 5G, LTE, WCDMA, CDMA, ix, time division-synchronous code division multiple access (TS-SCDMA), GSM, and 802.11. The wireless device may also support a carrier aggregation technology.

A plurality of wireless devices may perform a same service or different services, for example, a mobile broadband service, an enhanced mobile broadband (eMBB) service, or a terminal-related ultra-reliable and low-latency communication (URLLC) service.

Figure 2:
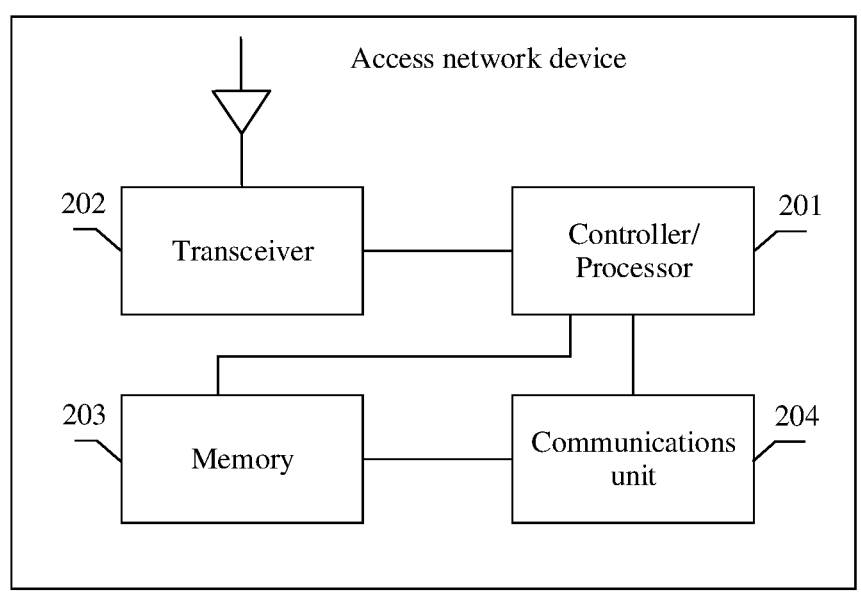
FIG. 2 is a schematic diagram of a possible structure of an access network device in the foregoing wireless communications system.

Further, a schematic diagram of a possible structure of the access network device 102 may be shown in FIG. 2. The access network device 102 can perform a method provided in the embodiments of the present invention. The access network device 102 may include a controller/processor 201 (the processor 201 is used as an example below for description), and a transceiver 202. The controller/processor 201 may also be referred to as a modem processor sometimes. The modem processor 201 may include a baseband processor (BBP) (not shown). The baseband processor processes a received digitalized signal, to extract information or a data bit transmitted in the signal. Therefore, based on a requirement or an expectation, the BBP is usually implemented in one or more digital signal processors (DSP) in the modem processor 201 or implemented as a separated integrated circuit (IC).

The transceiver 202 may be configured to: support information receiving and sending between the access network device 102 and the terminal devices, and support radio communication between the terminal devices. The processor 201 may be further configured to perform various functions for communication between the terminal device and another network device. In an uplink, an uplink signal from the terminal device is received through an antenna, demodulated by the transceiver 202, and further processed by the processor 201 to restore service data and/or signaling information sent by the terminal device. In a downlink, service data and/or a signaling message are/is processed by the terminal device and modulated by the transceiver 202, to generate a downlink signal, and the downlink signal is transmitted to UE through the antenna. The access network device 102 may further include a memory 203, configured to store program code and/or data of the access network device 102. The transceiver 202 may include an independent receiver circuit and an independent transmitter circuit, or may implement receiving and sending functions in a same circuit. The access network device 102 may further include a communications unit 204, configured to support the access network device 102 in communicating with another network entity. For example, the communications unit 204 is configured to support communication between the access network device 102 and a network device in a core network.

Optionally, the access network device may further include a bus. The transceiver 202, the memory 203, and the communications unit 204 may be connected to the processor 201 by using the bus. For example, the bus may be a peripheral component interconnect (PCI) bus or an extended industry standard architecture (EISA) bus. The bus may include an address bus, a data bus, a control bus, and the like.

Figure 3:
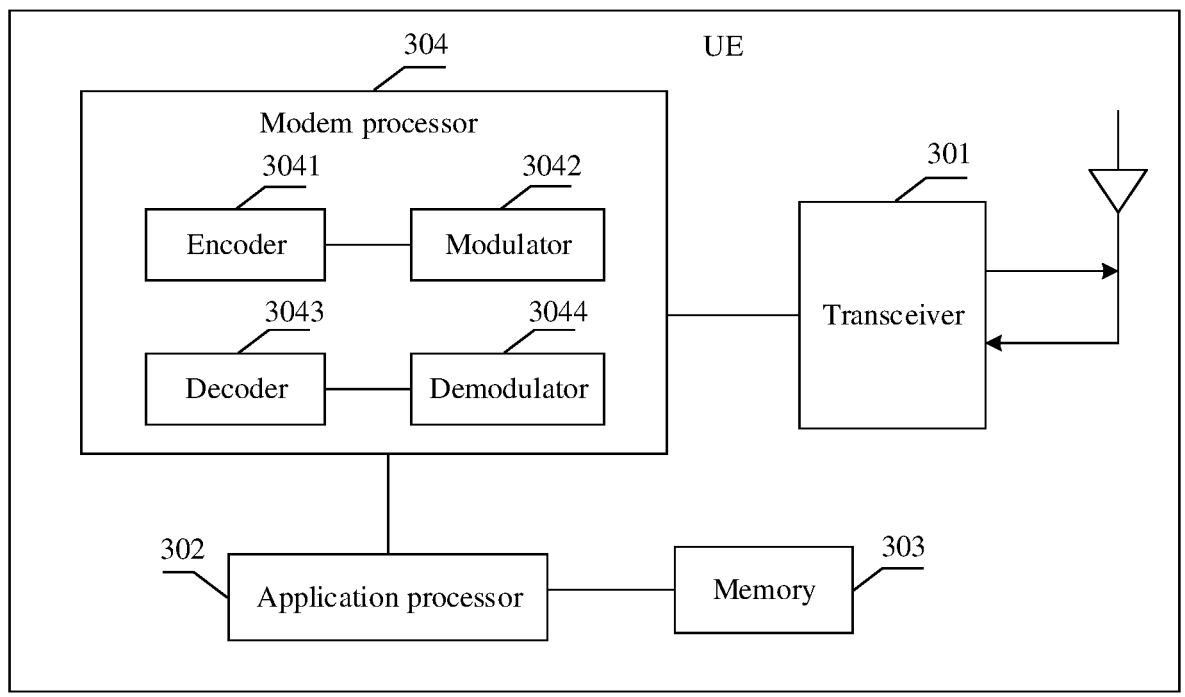
FIG. 3 is a schematic diagram of a possible structure of a terminal device in the foregoing wireless communications system.

FIG. 3 is a schematic diagram of a possible structure of a terminal device in the foregoing wireless communications system. The terminal device can perform a method provided in the embodiments of the present invention. The terminal device may be either of the two terminal devices 104. The terminal device includes a transceiver 301, an application processor (application processor) 302, a memory 303, and a modem processor (modem processor) 304.

The transceiver 301 may adjust (for example, perform analog conversion, filtering, amplification, and up-conversion on) an output sample and generate an uplink signal. The uplink signal is transmitted to the base station in the foregoing embodiments through an antenna. In a downlink, the antenna receives a downlink signal transmitted by an access network device. The transceiver 301 may adjust (for example, perform filtering, amplification, down-conversion, and digitalization on) the signal received from the antenna and provide an input sample.

The modem processor 304 is also referred to as a controller or a processor sometimes, and may include a baseband processor (BBP) (not shown). The baseband processor processes a received digitalized signal, to extract information or a data bit transmitted in the signal. Based on a requirement or an expectation, the BBP is usually implemented in one or more digits in the modem processor 304 or implemented as a separated integrated circuit (IC).

In a design, the modem processor 304 may include an encoder 3041, a modulator 3042, a decoder 3043, and a demodulator 3044. The encoder 3041 is configured to encode a to-be-sent signal. For example, the encoder 3041 may be configured to: receive service data and/or a signaling message that are/is to be sent in an uplink, and perform processing (for example, formatting, encoding, or interleaving) on the service data and the signaling message. The modulator 3042 is configured to modulate an output signal of the encoder 3041. For example, the modulator may perform processing such as symbol mapping and/or modulation on an output signal (data and/or signaling) of the encoder, and provide an output sample. The demodulator 3044 is configured to demodulate an input signal. For example, the demodulator 3044 processes an input sample and provides symbol estimation. The decoder 3043 is configured to decode a demodulated input signal. For example, the decoder 3043 performs processing such as de-interleaving and/or decoding on the demodulated input signal, and outputs a decoded signal (data and/or signaling). The encoder 3041, the modulator 3042, the demodulator 3044, and the decoder 3043 may be implemented by the integrated modem processor 304. The units perform processing based on a radio access technology used in a radio access network.

The modem processor 304 receives, from the application processor 302, digitalized data that may represent a voice, data, or control information, and processes the digitalized data for transmission. The modem processor 304 may support one or more of a plurality of wireless communications protocols of a plurality of communications systems, for example, LTE, new radio, a universal mobile telecommunications system (UMTS), high speed packet access (HSPA), and an intelligent connected vehicle protocol. Optionally, the modem processor 304 may further include one or more memories.

Optionally, the modem processor 304 and the application processor 302 may be integrated in one processor chip.

The memory 303 is configured to store program code (which is also referred to as a program, instructions, software, or the like sometimes) and/or data that are/is used to support communication of the terminal device.

It should be noted that the memory 203 or the memory 303 may include one or more storage units, for example, may be a storage unit that is inside the processor 201, the modem processor 304, or the application processor 302 and that is configured to store program code, or may be an external storage unit independent of the processor 201, the modem processor 304, or the application processor 302, or may be further a component including a storage unit inside the processor 201, the modem processor 304, or the application processor 302 and an external storage unit independent of the processor 201, the modem processor 304, or the application processor 302.

The processor 201 and the modem processor 301 may be processors of a same type, or may be processors of different types. For example, the processor 201 or the modem processor 304 may be implemented as a central processing unit (CPU), a general-purpose processor, a digital signal processor (DSP), an application-specific integrated circuit (ASIC), a field programmable gate array (FPGA) or another programmable logic device, a transistor logic device, a hardware component, another integrated circuit, or any combination thereof. The processor 201 and the modem processor 301 may implement or execute various example logical blocks, modules, and circuits described with reference to content disclosed in the embodiments of the present invention. The processor may also be a combination that implements a computing function device, for example, a combination including one or more microprocessors, a combination of a DSP and a microprocessor, or a system-on-a-chip (SOC).

A person skilled in the art can understand that various explanatory logic blocks, modules, circuits, and algorithms described with reference to the various aspects disclosed in this application may be implemented as electronic hardware, an instruction that is stored in a memory or another computer-readable medium and that is executed by a processor or another processing device, or a combination thereof. For example, the device described in this specification may be applied to any circuit, hardware component, IC, or IC chip. The memory disclosed in this application may be any type of memory in any size, and may be configured to store any type of required information. To clearly explain such interchangeability, various explanatory components, blocks, modules, circuits, and steps have been generally described above based on functionality. How to implement such functionality depends on a specific application, a design selection, and/or a design constraint that is imposed on an entire system. A person skilled in the art may use different manners to implement the described functionality for each particular application, but it should not be considered that such implementation goes beyond the scope of the present invention.

Terms in the embodiments of this application are first described.

Control resource set (CORESET): To improve efficiency of performing blind detection on a control channel by a terminal device, a 5G system uses the control resource set (control resource set, which is referred to as CORESET below). A network device may configure one or more control resource sets for the terminal device to send a PDCCH. The network device may send a control channel to the terminal device on any control resource set corresponding to the terminal device. In addition, the network device further sends another configuration, such as a search space set, associated with the control resource set to the terminal device. Control resource sets have a difference in configuration information, for example, a difference in a frequency-domain width or a difference in a time-domain length. Alternatively, the control resource set in the embodiments of this application may be a CORESET, a control region, an enhanced physical downlink control channel (enhanced PDCCH) set, or the like defined in the 5G mobile communications system.

A synchronization signal/physical broadcast channel block (SSB) includes at least one of a primary synchronization signal (PSS), a secondary synchronization signal (SSS), and a PBCH. The SSB is mainly used for cell search, cell synchronization, and carrying a signal of broadcast information, and may be further used for RRM measurement and/or channel quality measurement.

As described above, in the conventional technology, all SSBs are sent in a time division multiplexing manner. To be specific, the SSB is sent at one frequency of one carrier or bandwidth part, and the SSB is not sent at another frequency at the same time. To enlarge cell coverage, the network device needs to send a plurality of SSBs. Optionally, the plurality of SSBs may correspond to a plurality of beam directions. However, an access delay of the terminal device may increase when the plurality of SSBs are sent through time division. In addition, because the network device needs to send the plurality of SSBs in a half frame, and needs to enable sending of the SSB in time of the half frame. However, longer time for enabling this function by the network device requires large energy consumption, and therefore this manner is not conducive to energy saving of the network device. In addition, the terminal device also needs to continuously detect the SSB in the time of the half frame. Therefore, this manner is not conducive to energy saving of the terminal device.

In the embodiments of the present invention, a carrier and a serving cell have a same definition, and may be replaced with a same term below. In addition, in the embodiments of the present invention, the SSB is sent for a single carrier, a single serving cell, or a single bandwidth part (BWP). For ease of description, one of the single carrier, the single serving cell, or the single bandwidth part is used as an example for description, for example, the single carrier is used as an example for description.

A bandwidth part (BWP) is a subset of a serving cell. One serving cell includes a maximum of four BWPs. One terminal device can transmit a signal on only an activated BWP at one moment. In the conventional technology, one terminal has only one activated BWP at one moment. Based on this, in the embodiments of the present invention, it is proposed that the SSB may be sent in a frequency division multiplexing (FDM) manner. For example, the network device sends the SSB at least two frequencies at the same time on a carrier or a bandwidth part. To send the SSB in an FDM manner, an SSB pattern is proposed in the embodiments of the present invention, which provides a possibility for sending the SSB in an FDM manner. In this manner, efficiency of sending an SSB in frequency domain can be improved. Because a plurality of SSBs may exist in frequency domain, the terminal device may quickly receive the SSB in frequency domain, which provides a possibility for the terminal device to quickly detect the SSB.

It should be noted that in the embodiments of the present invention, there may be the following two implementations of time-domain resources occupied by candidate SSBs at the same time.

In one possible implementation, not all time-domain resources occupied by candidate SSBs in frequency division multiplexing need to be the same. "The same time" is a part in which the time-domain resources occupied by the candidate SSBs have an overlapping time-domain symbol. For example, each SSB occupies four time-domain symbols (symbol). In this possible implementation, FDM may mean that some time-domain symbols of at least two SSBs overlap in time domain, and it is not required that all time-domain symbols overlap completely.

In the other possible implementation, all time-domain resources occupied by candidate SSBs in frequency division multiplexing are the same. "The same time" means that the time-domain resources occupied by the candidate SSBs are completely the same. For example, each SSB occupies four time-domain symbols. In this implementation, FDM may mean that all time-domain symbols of at least two SSBs overlap in time domain.

It may be understood that although the SSB pattern provided in the embodiments of the present invention is in FDM, that is, a plurality of candidate SSBs are in FDM, it is not necessarily to send the SSB in an FDM manner in the embodiments of the present invention. Sending the SSB in an FDM manner is merely an example. The sending the SSB in an FDM manner may include sending the SSB only in an FDM manner or sending the SSB in an FDM manner and a TDM manner.

Further, when the SSB is sent in an FDM manner, the terminal device cannot determine a time-frequency resource of the SSB based on indication information of the current SSB. Therefore, the embodiments of the present invention further provide a new resource indication of the SSB. Therefore, another problem to be resolved in the embodiments of the present invention is how to indicate a time-frequency resource of an SSB when the SSB is sent in an FDM manner, or how to indicate whether a candidate SSB or an actually sent SSB exists at a frequency in a current serving cell other than a frequency on which the SSB is currently detected, so that based on the indication information, the terminal device can complete slot-level synchronization, determine an actually sent SSB, or measure channel quality on a time-frequency resource of an SSB and report a corresponding channel quality measurement result.

An SSB pattern on a single carrier or in a single BWP in the embodiments of the present invention is described below. In the embodiments of the present invention, the SSB pattern is also referred to as an FDM SSB pattern.

In the FDM SSB pattern in the embodiments of the present invention, at least two candidate SSBs in FDM are the same in terms of one or more of a time-domain location, a period, or subcarrier spacing.

Specifically, the at least two candidate SSBs in FDM have a same time-domain location, for example, located in a same time-domain symbol; or the at least two candidate SSBs in FDM have a same sending period; or the at least two candidate SSBs in FDM have same subcarrier spacing. Alternatively, the at least two candidate SSBs are the same in terms of any two of the time-domain location, the period, or the subcarrier spacing; or the at least two candidate SSBs are the same in terms of all of the time-domain location, the period, and the subcarrier spacing.

It should be noted that the FDM SSB pattern provided in the embodiments of the present invention may be applied to each scenario in which an SSB is sent, for example, may be applied to only a scenario in which an initially accessed SSB is sent, may be applied to only a cell handover scenario, may be applied to only a scenario in which a secondary cell is added, or may be applied to only a measurement scenario of an SSB. Alternatively, the FDM SSB pattern provided in the embodiments of the present invention may be applied to the foregoing scenario in which an SSB needs to be sent, or the SSB pattern provided in the embodiments of the present invention is used in all scenarios in which an SSB is sent.

Optionally, when the SSB pattern is applied to initial access, a candidate time-domain location of an SSB may be set in a manner in the conventional technology. A PBCH DMRS and a MIB indicate only time-domain indexes of at least two SSBs in FDM, or the PBCH DMRS indicates only the time-domain indexes of the at least two SSBs in FDM. It should be noted that the current "only" indicates that the PBCH DMRS and/or the MIB do/does not indicate frequency-domain indexes of the at least two SSBs. The embodiments do not exclude a case in which the PBCH DMRS and/or the MIB may further indicate information other than the time-domain indexes and the frequency-domain indexes of the at least two SSBs in FDM. In other words, an index that is of an SSB and that is indicated by the PBCH DMRS and/or the MIB is related to only time-domain locations of the at least two SSBs. The foregoing design of the FDM SSB pattern enables both a terminal device supporting an FDM SSB and an existing terminal device that does not support an FDM SSB to access a network by using an FDM SSB, to complete slot-level synchronization.

Alternatively, when the SSB pattern is applied to initial access, a candidate time-domain location of an SSB may be set in a manner in the conventional technology. A PBCH DMRS and a MIB indicate not only time-domain indexes of at least two SSBs in FDM or the PBCH DMRS indicates not only the time-domain indexes of the at least two SSBs in FDM, but also frequency-domain indexes of the at least two SSBs. In this case, indicating the frequency-domain indexes of the at least two SSBs may be invalid for an existing terminal device that does not support an FDM SSB. In this way, both a terminal device supporting an FDM SSB and the existing terminal device that does not support an FDM SSB can complete slot-level synchronization based on the time-domain index.

Optionally, a frequency offset between candidate SSBs in FDM, that is, a frequency interval between at least two candidate SSBs in FDM, may be predefined in a protocol, or may be indicated by using signaling (at least one of signaling such as a MIB, a SIB, or RRC).

Optionally, the at least two candidate SSBs in FDM are located on different global synchronization channel number (GSCN) grids (grid). Considering that the existing terminal device that does not support an FDM SSB searches for an SSB on only a GSCN grid, this design proposed in the embodiments of the present invention enables both the terminal device supporting an FDM SSB and the existing terminal device that does not support an FDM SSB to access a network by using any SSB in FDM, without affecting access of the terminal device that does not support FDM.

Figure 4A:
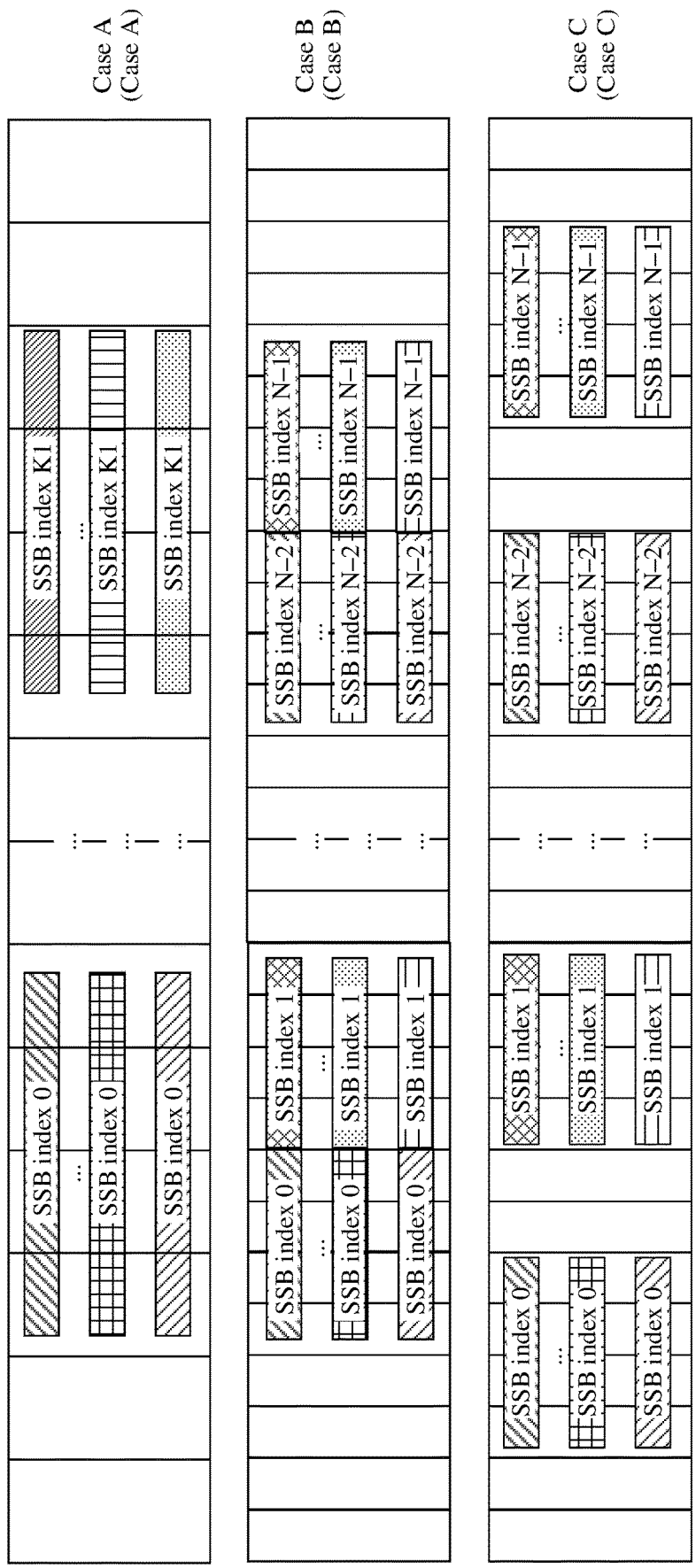
FIG. 4A and FIG. 4B are a schematic diagram of an SSB pattern according to an embodiment of the present invention.
Figure 4B:
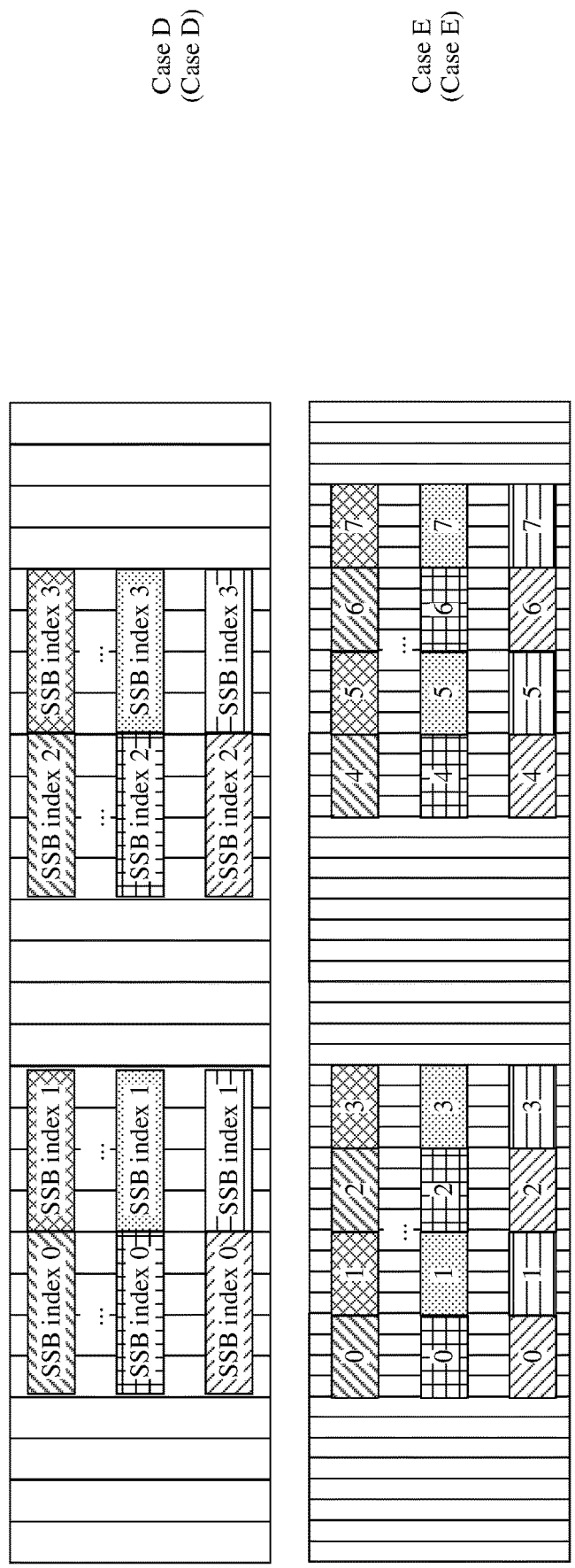

In an example, for different subcarrier spacing, there may be five FDM SSB patterns shown in FIG. 4A and FIG. 4B. In different cases, a candidate time-domain location of an SSB may be a time-domain location in the conventional technology, and there may be a plurality of candidate frequency-domain locations of the SSB in different frequency-domain locations at a same time-domain location. Specifically, in Case A in which subcarrier spacing is 15 kHz, a candidate SSB has K1+1 time-domain locations in a slot, and the candidate SSB (that is, the candidate SSB exists) may be sent at a plurality of frequencies at each time-domain location, where the plurality of frequencies may also be referred to as candidate frequency-domain locations. Indexes of a plurality of candidate SSBs at a same time-domain location are all the same. Both Case B and Case C are specific to subcarrier spacing of 30 kHz. It may be learned that similar to Case A, indexes of a plurality of candidate SSBs at a same time-domain location are all the same. In a slot, time-domain locations of two candidate SSBs in Case B are continuous, and time-domain locations of two candidate SSBs in Case C are discontinuous. In Case D in which subcarrier spacing is 120 kHz and Case E in which subcarrier spacing is 240 kHz, a candidate time-domain location may be set in an existing manner, and time-domain indexes of a plurality of candidate SSBs at a same time-domain location are the same.

In an optional embodiment, for different subcarrier spacing, candidate time-domain locations of an SSB in the FDM SSB pattern may be less than candidate time-domain locations of the SSB in the conventional technology in a case of same subcarrier spacing. This has the following advantage: Time for sending the SSB by the network device can be reduced, so that energy saving can be achieved in terms of the time.

In addition, the embodiments of the present invention further provide some bands to which an FDM SSB may be applied.

A current band in new radio (NR) is shown in the following Table 1.

TABLE 1

Operating bands of NR in a frequency range 1 (FR1)

| Operating band of NR | Uplink operating band BS receiving/UE sending $F_{UL\_low}$-$F_{UL\_high}$ | Downlink operating band BS sending/UE receiving $F_{DL\_low}$-$F_{DL\_high}$ | Duplex mode |
|---|---|---|---|
| n1 | 1920 MHz-1980 MHz | 2110 MHz-2170 MHz | FDD |
| n2 | 1850 MHz-1910 MHz | 1930 MHz-1990 MHz | FDD |
| n3 | 1710 MHz-1785 MHz | 1805 MHz-1880 MHz | FDD |
| n5 | 824 MHz-849 MHz | 869 MHz-894 MHz | FDD |
| n7 | 2500 MHz-2570 MHz | 2620 MHz-2690 MHz | FDD |
| n8 | 880 MHz-915 MHz | 925 MHz-960 MHz | FDD |
| n12 | 699 MHz-716 MHz | 729 MHz-746 MHz | FDD |
| n14 | 788 MHz-798 MHz | 758 MHz-768 MHz | FDD |

TABLE 1-continued

Operating bands of NR in a frequency range 1 (FR1)

| Operating band of NR | Uplink operating band BS receiving/UE sending FUL_low-FUL_high | Downlink operating band BS sending/UE receiving FDL_low-FDL_high | Duplex mode |
|---|---|---|---|
| n18 | 815 MHz-830 MHz | 860 MHz-875 MHz | FDD |
| n20 | 832 MHz-862 MHz | 791 MHz-821 MHz | FDD |
| n25 | 1850 MHz-1915 MHz | 1930 MHz-1995 MHz | FDD |
| n28 | 703 MHz-748 MHz | 758 MHz-803 MHz | FDD |
| n29 | N/A | 717 MHz-728 MHz | SDL |
| n303 | 2305 MHz-2315 MHz | 2350 MHz-2360 MHz | FDD |
| n34 | 2010 MHz-2025 MHz | 2010 MHz-2025 MHz | TDD |
| n38 | 2570 MHz-2620 MHz | 2570 MHz-2620 MHz | TDD |
| n39 | 1880 MHz-1920 MHz | 1880 MHz-1920 MHz | TDD |
| n40 | 2300 MHz-2400 MHz | 2300 MHz-2400 MHz | TDD |
| n41 | 2496 MHz-2690 MHz | 2496 MHz-2690 MHz | TDD |
| n48 | 3550 MHz-3700 MHz | 3550 MHz-3700 MHz | TDD |
| n50 | 1432 MHz-1517 MHz | 1432 MHz-1517 MHz | TDD 1 |
| n51 | 1427 MHz-1432 MHz | 1427 MHz-1432 MHz | TDD |
| n65 | 1920 MHz-2010 MHz | 2110 MHz-2200 MHz | FDD 4 |
| n66 | 1710 MHz-1780 MHz | 2110 MHz-2200 MHz | FDD |
| n70 | 1695 MHz-1710 MHz | 1995 MHz-2020 MHz | FDD |
| n71 | 663 MHz-698 MHz | 617 MHz-652 MHz | FDD |
| n74 | 1427 MHz-1470 MHz | 1475 MHz-1518 MHz | FDD |
| n75 | N/A | 1432 MHz-1517 MHz | SDL |
| n76 | N/A | 1427 MHz-1432 MHz | SDL |
| n77 | 3300 MHz-4200 MHz | 3300 MHz-4200 MHz | TDD |
| n78 | 3300 MHz-3800 MHz | 3300 MHz-3800 MHz | TDD |
| n79 | 4400 MHz-5000 MHz | 4400 MHz-5000 MHz | TDD |
| n80 | 1710 MHz-1785 MHz | N/A | SUL |
| n81 | 880 MHz-915 MHz | N/A | SUL |
| n82 | 832 MHz-862 MHz | N/A | SUL |
| n83 | 703 MHz-748 MHz | N/A | SUL |
| n84 | 1920 MHz-1980 MHz | N/A | SUL |
| n86 | 1710 MHz-1780 MHz | N/A | SUL |
| n89 | 824 MHz-849 MHz | N/A | SUL |
| n90 | 2496 MHz-2690 MHz | 2496 MHz-2690 MHz | TDD 5 |

Further, when the embodiments of the present invention are applied to the foregoing NR band, an SSB in FDM may be sent in the following three cases. In other words, in the following three cases, a carrier or an SSB on a carrier on which a BWP is located may be sent at a plurality of frequencies at the same time.

Case 1: An n79 band whose minimum band is 40 MHz.

Case 2: A data channel has subcarrier spacing of 30 kHz and supports a minimum bandwidth of 10 MHz, and SSB subcarrier spacing is 15 kHz. An applicable band is one or more of n1, n2, n3, n5, n7, n8, n12, n14, n18, n20, n25, n28, n29, n30, n34, n38, n39, n40, n41, n48, n50, n65, n66, n70, n71, n74, n75, n77, n78, n80, n81, n82, n83, n84, n86, or n89.

Case 3: A data channel has subcarrier spacing of 15 kHz and supports a minimum bandwidth of 10 MHz, and SSB subcarrier spacing is 15 kHz. An applicable band is one or more of n41, n77, n78, or n91.

In the foregoing several cases, a maximum quantity of SSBs that can be in frequency division multiplexing in a minimum support bandwidth may be shown in Table 2 to Table 5.

In one embodiment, when a guard bandwidth is not considered, in the n79 band and a minimum support bandwidth of 40 MHz, a quantity of SSBs whose SSB subcarrier spacing is 15 kHz and 30 kHz may be shown in Table 2. For example, when SSBs are closely arranged, for the subcarrier spacing of 15 kHz, a maximum quantity of SSBs that can be placed in the minimum support bandwidth is 9, and a frequency interval between the SSBs is 0.72 MHz.

TABLE 2

| | Closely arranged | | Not closely arranged | |
|---|---|---|---|---|
| SSB subcarrier spacing | 15 kHz | 30 kHz | 15 kHz | 30 kHz |
| A maximum quantity of SSBs that can be placed | 9 | 5 | 8 | 4 |
| SSB spacing (MHz) | 0.72 | 0 | 0.72 | 1.44 or 2.88 |

In another embodiment, when the guard bandwidth is not considered, in a scenario in which a minimum support bandwidth is 10 M and SSB subcarrier spacing is 15 kHz, a quantity of SSBs is shown in Table 3. For example, when SSBs are not closely arranged, in a band (sub 3G) less than 3 GHz, a maximum quantity of SSBs that can be placed in the minimum support bandwidth is 2, and a frequency interval between the SSBs is 2.6 MHz, 1.2 MHz, or 0.1 MHz.

TABLE 3

| | Closely arranged | | Not closely arranged | |
|---|---|---|---|---|
| Band | Less than 3 GHz | 3 GHz-6 GHz | Less than 3 GHz | 3 GHz-6 GHz |
| A maximum quantity of SSBs that can be placed | 2 | 2 | 2 | 2 |
| SSB spacing (MHz) | 0 | 0.72 | 2.6, 1.2, or 0.1 | 0.72 |

In another embodiment, when 10% of the guard bandwidth is considered, in the n79 band and a minimum support bandwidth of 40 MHz, a quantity of SSBs whose SSB subcarrier spacing is 15 kHz and 30 kHz may be shown in Table 4. For example, when SSBs are not closely arranged, for the subcarrier spacing of 15 kHz, a maximum quantity of SSBs that can be placed in the minimum support bandwidth is 8, and a frequency interval between the SSBs is 0.72 MHz.

TABLE 4

| | Closely arranged | | Not closely arranged | |
|---|---|---|---|---|
| SSB subcarrier spacing | 15 kHz | 30 kHz | 15 kHz | 30 kHz |
| A maximum quantity of SSBs that can be placed | 8 | 5 | 8 | 4 |
| SSB spacing (MHz) | 0.72 | 0 | 0.72 | 1.44 |

In another embodiment, when 10% of the guard bandwidth is considered, in a scenario in which a minimum support bandwidth is 10 M and SSB subcarrier spacing is 15 kHz, a quantity of SSBs is shown in Table 5. For example, when SSBs are closely arranged, in a band (sub 3G) less than 3 GHz, a maximum quantity of SSBs that can be placed in the minimum support bandwidth is 2, and a frequency interval between the SSBs is 2.6 MHz, 1.2 MHz, or 0.1 MHz.

TABLE 5

| Band | Closely arranged | | Not closely arranged | |
|---|---|---|---|---|
| | Less than 3 GHz | 3 GHz-6 GHz | Less than 3 GHz | 3 GHz-6 GHz |
| A maximum quantity of SSBs that can be placed | 2 | 2 | 2 | 2 |
| SSB spacing (MHz) | 0 | 0.72 | 1.4, 1.2, or 0.1 | 0.72 |

The foregoing provided embodiments shown in Table 2 to Table 5 are examples, and the SSB may be set in another manner in the embodiments of the present invention. In addition, the bands corresponding to the foregoing provided examples may also be other bands in the three cases provided in the foregoing embodiments, and are not limited to the n79 band.

In addition, as described above, another problem that needs to be resolved in the embodiments of the present invention is how to indicate a time-frequency resource of an SSB when the SSB can be sent in an FDM manner, or how to indicate whether an SSB exists on another frequency in a current serving cell other than a frequency on which the SSB is currently detected. A resource configuration manner of an FDM SSB provided in the embodiments of the present invention is described below.

Indication manner 1: An indication field is added to SIB or RRC signaling to indicate a time-frequency resource of a candidate SSB. This may be specifically implemented by using the following embodiment.

Optionally, the SIB signaling in this embodiment of the present invention may be SIB1 signaling. All SIB1 signaling in the following is an example, and this embodiment of the present invention is not limited to the SIB1. It should be noted that the SIB1 signaling is preferred in this embodiment of the present invention.

The indication field in this embodiment of the present invention may also be referred to as indication information. For example, the indication field carries the indication information, and the indication information is used to indicate the time-frequency resource of the candidate SSB. Certainly, it may be considered that the indication field is used to indicate the time-frequency resource of the candidate SSB. This is not distinguished in this embodiment of the present invention.

In this embodiment, the time-frequency resource of the candidate SSB means that a time-frequency resource location of the candidate SSB may be used to send an SSB or detect an SSB, and whether the SSB is sent at the location or whether the SSB can be detected at the location depends on implementation of the network device. This embodiment includes a time-frequency resource actually used to send an SSB and the time-frequency resource of the candidate SSB. The time-frequency resource actually used to send an SSB is a subset of the time-frequency resource of the candidate SSB.

Optionally, the indication field may indicate an index of an actually sent SSB in the candidate SSB, or indicate a frequency-domain index and a time-domain index of the actually sent SSB in the candidate SSB.

Figure 5:
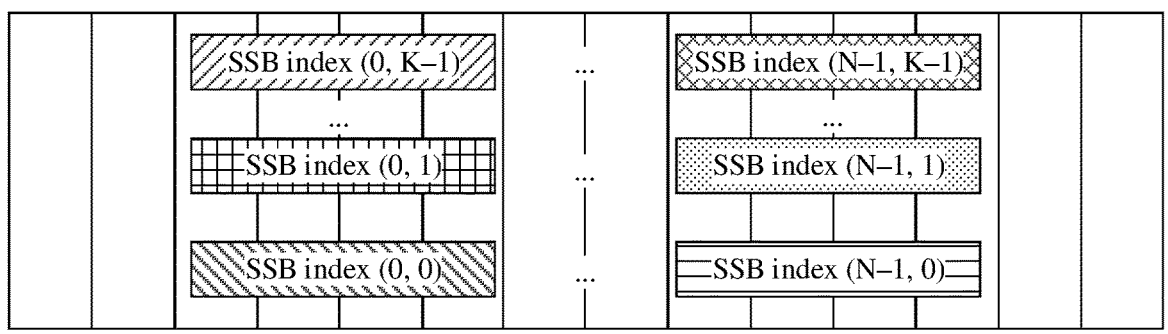
FIG. 5 is a schematic diagram of a frequency-domain index in an SSB pattern according to an embodiment of the present invention.
Figure 6:
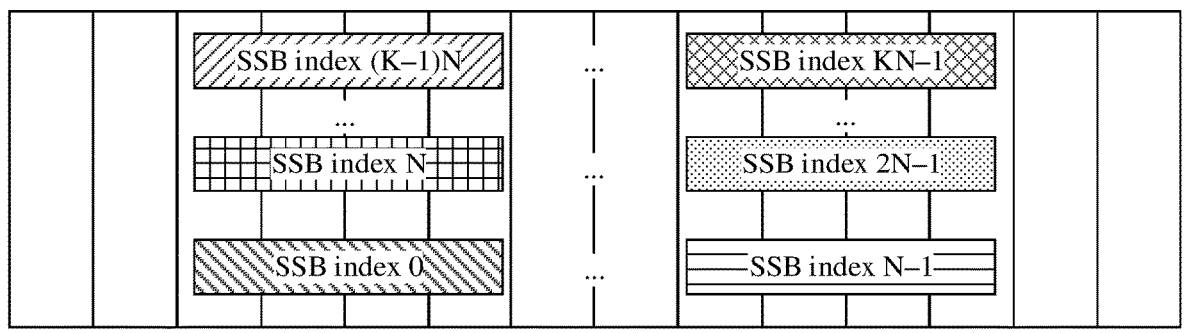
FIG. 6 is a schematic diagram of another frequency-domain index in an SSB pattern according to an embodiment of the present invention.

Optionally, the indication field may indicate the index of the actually sent SSB, as shown in FIG. 6; or indicate the frequency-domain index and the time-domain index of the actually sent SSB, as shown in FIG. 5.

There is a correspondence between an index and a time-frequency resource that are of an SSB. A location of a time-frequency resource of a candidate SSB in an SSB pattern may be obtained by using the foregoing FDM SSB pattern and the indication field. For example, after the terminal device receives the indication field, the terminal device can learn of an index that is of an SSB and that corresponds to the indication field, then can determine a frequency-domain resource location of another candidate SSB in the SSB pattern based on an SSB index in the predefined FDM SSB pattern and a time-frequency resource location of the SSB, and further learn of the time-domain resource location of the SSB based on a PBCH DMRS and/or MIB information, that is, learn of the time-frequency resource location of the SSB. The FDM SSB pattern may be shown in FIG. 4A and FIG. 4B. For example, the terminal device receives an SSB in an initial access process. In this case, the terminal device can determine a location of a time-frequency resource of the SSB based on a location at which the SSB is received. SIB1 signaling or RRC signaling corresponding to the SSB is further carried in the indication information, and the indication information indicates indexes of all actually sent SSBs, for example, the index is an index N−1 in FIG. 6. In this case, the terminal device can determine a location of the SSB in the SSB pattern based on the index, and further determine a location of a time-frequency resource of another candidate SSB in the SSB pattern.

Descriptions of an index of an SSB or a frequency-domain index and a time-domain index of the SSB are further described below in detail.

Specifically, the indication field may be implemented in the following several embodiments.

In one embodiment, the SIB or RRC signaling includes a first indication field. The first indication field is an optional field. The first indication field indicates that a multiplexing manner of a candidate SSB is one of FDM or TDM; or the first indication field indicates a quantity of frequencies of the candidate SSB; or the first indication field indicates a frequency of the candidate SSB; or the first indication field indicates an SSB pattern. For example, the first indication field indicates one of a plurality of predefined SSB patterns.

For example, when the first indication field does not exist or a value of the first indication field is 0, it indicates that the SSB is sent in a TDM manner; and when the value of the first indication field is 1, it indicates that the SSB is sent in an FDM manner.

It should be noted that if the first indication information in this embodiment of the present invention indicates that the multiplexing manner of the candidate SSB is TDM, the SSB is sent only in a TDM manner, for example, in a manner in the conventional technology. Alternatively, if the first indication information in this embodiment of the present invention indicates that the multiplexing manner of the candidate SSB is FDM, the SSB may be sent in an FDM manner, that is, there is only one group of candidate SSBs in a frequency division multiplexing manner in a half frame; or the SSB may be sent in a TDM+FDM manner, that is, there are at least two groups of candidate SSBs in frequency division multiplexing in the half frame. A group of candidate SSBs in a frequency division multiplexing manner may be that a plurality of SSBs at different frequencies include one or more same time-domain symbols.

It may be understood that the first indication field is valid for a terminal device supporting an FDM SSB. For example, the terminal device of this type may parse the first indication field and perform a corresponding operation based on information indicated by the first indication field. However, the first indication field is invalid for a terminal device that does not support an FDM SSB, that is, the terminal device of this type cannot parse the first indication field.

It may be understood that the SIB signaling may be SIB1 signaling.

In another embodiment, the indication field may include the following second indication field. The second indication field may be included in the RRC signaling, or may be included in the SIB signaling, especially in the SIB1 signaling. In this embodiment, the SIB1 signaling is used as an example for description.

In one manner, the second indication information may indicate a frequency-domain index, in the SSB pattern, of an SSB associated with the SIB1.

In another manner, the second indication information indicates a frequency-domain index of an SSB. Optionally, the SSB is an initially accessed SSB, or the SSB may be a currently accessed SSB, or the SSB may be a to-be-accessed SSB.

The second indication information in the foregoing two manners may be sent by using the SIB1 signaling or the RRC signaling.

The second indication field may be a field added based on the first indication field, that is, the foregoing indication field includes the first indication field and the second indication field. The second indication field may exist independently, that is, the first indication field does not exist and the second indication field is included. In this case, the second indication field may also indicate that the multiplexing manner of the candidate SSB is FDM.

Optionally, if the first indication field indicates that the candidate SSB is in FDM, or if a candidate SSB in the SSB pattern indicated by the first indication field can be sent at a plurality of frequencies, or the quantity of frequencies indicated by the first indication field is greater than one, the SIB1 or RRC signaling may further include the second indication field.

Optionally, the first indication field does not exist. If the SIB1 signaling or the RRC signaling includes the second indication field, the terminal device considers by default that the candidate SSB is in FDM; or if the SIB1 signaling or the RRC signaling includes the second indication field, the terminal device considers by default that the candidate SSB is located at a plurality of frequencies, and a quantity of frequencies of the candidate SSB may be notified by using signaling or may be predefined; or if the SIB1 signaling or the RRC signaling includes the second indication field, the terminal device considers by default that the candidate SSB is located at a plurality of frequencies, and a frequency location of the candidate SSB may be obtained by using a predefined frequency interval or may be obtained by using a frequency interval notified by using signaling; or if the SIB1 signaling or the RRC signaling includes the second indication field, the terminal device uses the FDM SSB pattern by default, and the FDM SSB pattern may be predefined.

In a scenario in which the SIB1 signaling includes the second indication field, that is, the SIB1 carries second indication information by using the second indication field, the second indication field or the second indication information may indicate a frequency-domain index, in the SSB pattern, of an SSB corresponding to the SIB1 signaling. The frequency-domain index is a relative frequency-domain location, in the FDM SSB pattern, of the SSB corresponding to the SIB1 signaling, such as j in an SSB index (i, j) in FIG. 5. Alternatively, the RRC signaling carries the second indication field, and the second indication field indicates the frequency-domain index, in the SSB pattern, of the SSB corresponding to the SIB1 signaling.

Optionally, the SSB corresponding to the SIB1 signaling may be an SSB associated with a CORESET #0 in which a PDCCH for scheduling the SIB1 is located.

One or more CORESETs #0 are associated with one SSB, that is, the CORESET #0 and the SSB may be in a one-to-one association relationship or a many-to-one association relationship. A plurality of association relationships are predefined, and a current association relationship is indicated by using a master information block (master information block, MIB).

In a scenario in which the RRC signaling includes the second indication field, that is, the RRC signaling carries second indication information by using the second indication field, the second indication information or the second indication field is used to indicate a frequency-domain index of a currently accessed SSB or a frequency-domain index of a to-be-accessed SSB. A frequency of the currently accessed SSB is obtained through access. The RRC signaling indicates a relative frequency-domain location that is of an SSB at a frequency to be accessed by the terminal device and that is in an SSB pattern in a cell to be accessed by the terminal device. For example, in cell handover, the second indication field in the RRC signaling indicates a frequency-domain index of a to-be accessed SSB. For another example, in a scenario in which a secondary cell (secondary cell, SCell) is added, the RRC signaling indicates a frequency-domain index of a to-be-accessed SSB by using the second indication field.

Optionally, the frequency-domain index may be a relative frequency-domain location of an SSB in the FDM SSB pattern, as shown in FIG. 5. For example, it is assumed that there are a maximum of K SSBs in FDM. The SIB1 or RRC signaling indicates, by using the second indication information of log2(K) bits, that a frequency-domain index j of a current SSB is an integer greater than or equal to 0, and the frequency-domain index j that is of the current SSB and that is indicated by the second indication information may be a frequency-domain index j in the SSB pattern. K may be predefined, or K may be indicated by the network device by using signaling.

In another embodiment, the RRC signaling indicates a frequency of a to-be-accessed SSB, and it may be predefined by default that the frequency is a lowest frequency of an SSB in the FDM SSB pattern, or it may be predefined by default that the frequency is a frequency of the first SSB in frequency domain in the FDM SSB pattern, or it may be predefined by default that the frequency is a frequency of an SSB with a smallest index in frequency domain in the FDM SSB pattern, or it may be predefined by default that the frequency is a frequency of an SSB with a smallest index in the FDM SSB pattern.

In still another embodiment, optionally, the SIB or RRC signaling may further include a third indication field. The third indication field indicates an actual sending status of an SSB in a plurality of candidate SSBs in FDM.

Optionally, the third indication field may indicate, by using a bitmap (bitmap), whether an SSB exists at a corresponding frequency-domain location in the SSB pattern. Certainly, the third indication field may also indicate an actually sent SSB by sending a time-domain index and a frequency-domain index or by indicating an SSB index.

For example, it is assumed that there are a maximum of K SSBs in FDM. The third indication field indicates sending statuses of a plurality of frequency-domain candidate SSBs at a specific time-domain location by using a bitmap whose length is K. For example, the first bit (which may be a most significant bit or may be a least significant bit) of the bitmap corresponds to the first SSB (for example, the SSB has a smallest frequency-domain index or a lowest frequency) in frequency domain, the second bit corresponds to the second SSB in frequency domain, and so on.

If in the SSB pattern, the candidate SSB is in FDM and TDM, for example, in a half frame, there are a maximum of N candidate SSBs in TDM, an existing manner may be used to indicate a specific time-domain location at which there is a candidate SSB, for example, candidate SSBs exist in N1 time-domain locations in N time-domain locations. In this case, the third indication field may include N bitmaps whose lengths are K, which respectively indicate whether to send an SSB at K frequency-domain locations in each of the N time-domain locations. Alternatively, the third indication field may include N1 bitmaps whose lengths are K, which respectively indicate specific frequency-domain locations that are at all of the corresponding N1 time-domain locations and at which an SSB is to be sent. It may be understood that the N bitmaps whose lengths are K or the N1 bitmaps whose lengths are K may be a bitmap whose length is N*K or a bitmap whose length is N1*K that is formed in a time-domain sequence. It should be understood that the N1 time-domain locations may be indicated by another bitmap whose length is N.

Alternatively, for a terminal device that is in a connected state and that supports an FDM SSB, if the candidate SSB is in FDM, an SSB-PositionInBurst field in the RRC signaling may be re-interpreted in the following manner: SSB-PositionInBurst indicates whether four or eight or 64 candidate SSBs sorted in a sequence of first time domain and then frequency domain are sent.

In this embodiment, indication information in the SIB1 or RRC signaling indicates a multiplexing manner of an SSB, or indicates an SSB pattern, a frequency-domain index that is of an SSB whose frequency is known and that is in the SSB pattern, and a time-frequency index of an actually sent SSB, so that based on the information, a terminal device supporting an FDM SSB can learn of a time-frequency resource of the SSB and receive a system message, or measure channel quality on the time-frequency resource.

The first indication field in this embodiment may be an optional field. For example, content indicated by the first indication field may be directly indicated by using the second indication field or the third indication field.

It should be noted that if the second indication information and the third indication information both exist, an SSB indicated by the second indication information and an SSB indicated by the third indication information may be SSBs that are not completely the same. For example, the second indication information indicates a frequency-domain index of a currently accessed SSB; and the third indication information indicates one or more actually sent SSBs in the SSB pattern, where the one or more actually sent SSBs include an SSB other than the currently accessed SSB; or the third indication information indicates the currently accessed SSB and another actually sent SSB.

Indication manner 2: An embodiment of the present invention further provides a method for indicating a resource of an SSB and reporting related channel state information when a candidate SSB is in FDM during beam management (BM) or RRM measurement.

Method 1: The network device configures a time-domain index and a frequency-domain index of a candidate SSB used for BM or RRM measurement. To be specific, the network device sends the time-domain index and the frequency-domain index of the SSB to the terminal device by using signaling, and the network device indicates, by using the information, an SSB resource used to measure channel state information. Correspondingly, the terminal device may select, in SSBs configured by the network device, a part of the SSBs to report the channel state information, where the channel state information includes time-domain indexes and frequency-domain indexes of the part of the SSBs. Optionally, the channel state information further includes channel quality measurement results corresponding to the part of the SSBs.

For example, in a beam training process, the network device configures time-frequency resources of a plurality of SSBs, and the terminal device feeds back a part of relatively good SSBs based on a channel quality measurement result. For example, a base station configures time-frequency resources of 64 SSBs. After measurement, a terminal reports channel state information corresponding to four of the 64 SSBs. The network device sends, based on beams corresponding to the four SSBs, data or a signal such as a physical downlink shared channel (physical downlink shared channel, PDSCH).

For example, during resource configuration, the network device indicates that a time-domain index of an SSB is i and a frequency-domain index of the SSB is j. For example, resource configuration is performed by using at least one of RRC, media access control-control element (MAC-CE), or downlink control information (DCI). During reporting, a corresponding terminal device also reports the time-domain index and the frequency-domain index of the SSB, as shown in FIG. 5. In addition, the terminal device may further report L1-RSRP or an L1-SINR corresponding to a resource of the SSB.

Method 2: The network device configures an index of an SSB, where the index of the SSB is an absolute index of a time-frequency resource of the SSB. In this embodiment of the present invention, the absolute index is further referred to as the index of the SSB.

The absolute index may be obtained in a plurality of manners.

For example, the absolute index is an index obtained after time-frequency resources of the SSB are arranged in a sequence of first time domain and then frequency domain.

For another example, the absolute index is an index obtained after time-frequency resources of the SSB are arranged in a sequence of first frequency domain and then time domain.

For another example, the index of the SSB is an index that includes a time-domain index and a frequency-domain index of the SSB.

For another example, the index of the SSB is an index indicating a relative time-frequency resource location of the SSB in the SSB pattern.

For another example, the index of the SSB is equal to $N*j+i$, where N is a maximum quantity of SSBs in time domain of the SSB pattern, j is an index of a frequency-domain location of the SSB in the SSB pattern, and i is an index of a time-domain location of the SSB in the SSB pattern. A value range of i is {0, . . . , the maximum quantity of SSBs in time domain of the SSB pattern}, and a value range of j is {0, . . . , a maximum quantity of SSBs in frequency domain of the SSB pattern}.

For another example, it is assumed that there are N SSBs in time division multiplexing, a time-domain index of an SSB is i, and a frequency-domain index of the SSB is j. In this case, an absolute index of the SSB is that the SSB index=$N*j+i$, as shown in FIG. 6.

It should be noted that the frequency-domain index and the time-domain index, and the index of the SSB in the embodiments of the present invention all may be implemented in the manner described herein, for example, may be implemented in manners shown in FIG. 5 and FIG. 6. The frequency-domain index and the time-domain index, and the index of the SSB herein are not limited to being applied to SSB configuration during BM or RRM measurement.

Optionally, the network device may send the absolute index to the terminal device by using the RRC signaling, for example, may send the absolute index to the terminal device by using the SSB-PositionInBurst field in the RRC signaling.

Correspondingly, if an SSB is sent in an FDM manner, the terminal device may interpret the SSB-PositionInBurst field in the RRC signaling in the following manner: SSB-PositionInBurst indicates four or eight or 64 SSBs that are sorted in a sequence of first time domain and then frequency domain.

In this embodiment, a time-frequency resource location of an SSB may be learned of by indicating a time-domain resource index and a frequency-domain resource index of the SSB or an absolute index of a time-frequency resource of the SSB, so as to perform channel quality measurement and feedback.

It should be noted that the foregoing described embodiments are not necessarily to be used together. For example, when an initially accessed SSB is sent in an FDM manner, the SSB may be sent by using the FDM SSB pattern in the foregoing described embodiment. An indication manner may be another manner, and is not limited to the foregoing described manner. For another example, when an SSB used for BM or RRM measurement is sent in an FDM manner, resource configuration may be performed in the resource indication manner in the foregoing described embodiment, and the FDM SSB pattern may be in the manner described in the foregoing embodiment or may be in another manner.

Figure 7:
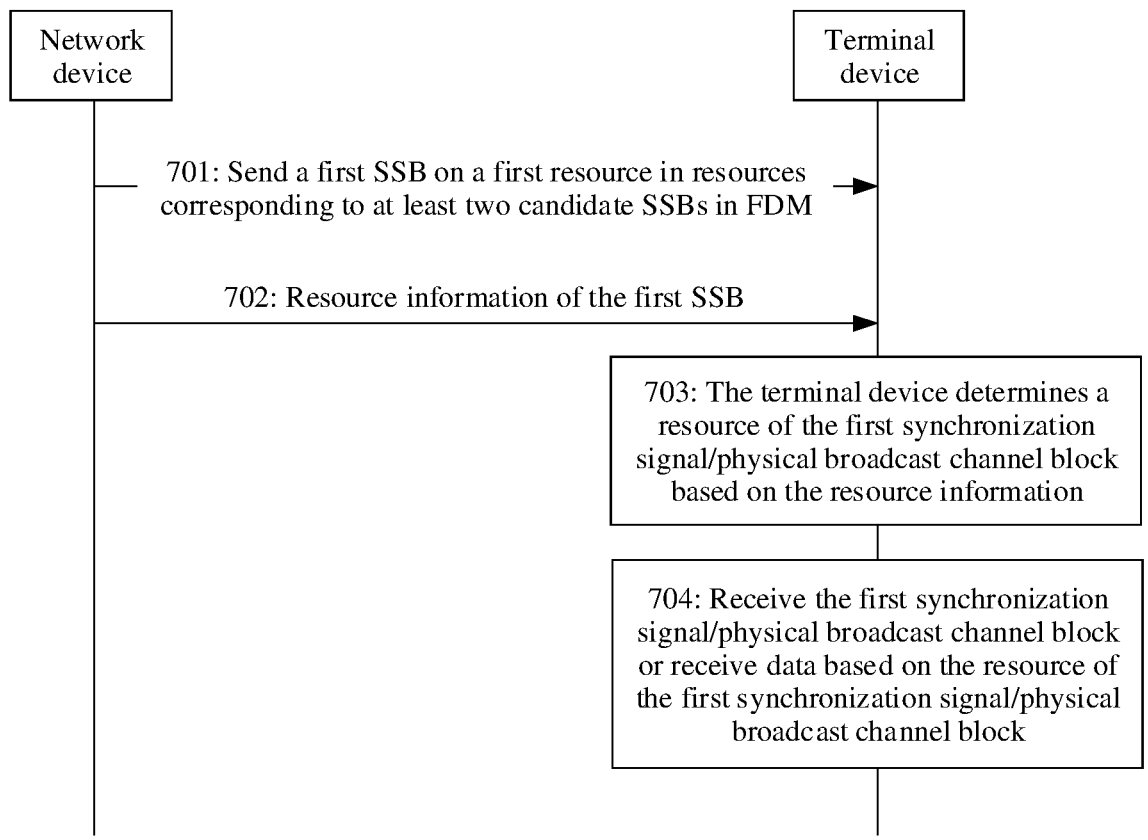
FIG. 7 is a schematic signaling diagram of a method according to an embodiment of the present invention.

A communications method in an embodiment of the present invention is described below with reference to the accompanying drawing, as shown in FIG. 7. The SSB pattern and the resource indication manner described in the foregoing embodiment may be applied to the communications method in this embodiment. The method includes the following steps.

Step 701: A network device sends a first SSB on a first resource in resources corresponding to at least two candidate SSBs in FDM; or the network device sends the first SSB on a first resource in resources corresponding to at least two candidate SSBs, where the at least two candidate SSBs are respectively located at least two frequencies in a single serving cell or a single bandwidth part in a frequency division multiplexing manner.

Optionally, this step may be implemented by using a transceiver of the network device or implemented by controlling the transceiver by a processor of the network device. The transceiver may be a transceiver unit in the network device or a transceiver unit in a chip of the network device.

Optionally, this step may be implemented by using a processing chip of the network device or implemented by using a transceiver unit in the processing chip.

In this embodiment, the SSB pattern is in FDM. However, when sending an SSB, the network device unnecessarily sends an SSB in FDM, and may send only one SSB at the same time. Therefore, there may be one or more first SSBs, that is, the first SSB may be one or more of the at least two SSBs. In this embodiment of the present invention, it is not necessarily to send the first SSB in all of the at least two SSBs. This embodiment is described for a specific first SSB block. If there are a plurality of first SSBs, each first SSB may have the following corresponding resource information, or some first SSBs may not have the following corresponding information.

The first SSB may be an initially accessed SSB, may be an SSB for cell handover, may be an SSB for measuring channel quality, or may be an SSB for performing rate matching by a terminal device based on the SSB.

Step 702: The network device sends resource information of the first SSB, and a terminal device receives the resource information of the first SSB.

Optionally, the operation of the network device in this step may be implemented by using the transceiver of the network device or implemented by controlling the transceiver by the processor of the network device. The transceiver may be the transceiver unit in the network device or the transceiver unit in the chip of the network device.

Optionally, the operation of the network device in this step may be implemented by using the processing chip of the network device or implemented by using the transceiver unit in the processing chip.

Optionally, the operation of the terminal device in this step may be implemented by using a transceiver of the terminal device or implemented by controlling the transceiver by a processor of the terminal device. The transceiver may be a transceiver unit in the terminal device or a transceiver unit in a chip of the terminal device.

Optionally, the operation of the terminal device in this step may be implemented by using a processing chip of the network device or implemented by using a transceiver unit in the processing chip.

Step 703: The terminal device determines a resource of the first synchronization signal/physical broadcast channel block based on the resource information.

Optionally, the operation of the terminal device in this step may be implemented by using the processor of the terminal device. The processor may be a processing unit in the terminal device.

Optionally, the operation of the terminal device in this step may be implemented by using the processing chip of the terminal device or implemented by using a processing unit in the processing chip.

In an implementation, the resource information of the first SSB is sent by using second indication information.

The second indication information indicates a frequency-domain index, in an SSB pattern (pattern), of the first SSB associated with a system information block type 1 SIB1; or the second indication information indicates a frequency-domain index of the first SSB.

The frequency-domain index may be the same as that described in the foregoing embodiment, that is, may be shown in FIG. 5.

Further, for how to send the second indication information, refer to the foregoing description.

Further, the sending resource information of the first SSB further includes: sending the resource information of the first SSB by using third indication information, where the third indication information indicates a frequency-domain resource of the first SSB in the at least two candidate SSBs.

Optionally, the third indication information is a bitmap, each bit of the bitmap corresponds to a candidate SSB, and each bit is used to indicate whether to send the corresponding SSB.

It should be noted that although both the second indication information and the third indication information in this embodiment are used to indicate the resource information of the first SSB, it is easy to understand that in this embodiment, the second indication information and the third indication information unnecessarily need to exist at the same time, and either of the second indication information and the third indication information may exist only.

In an example, first signaling includes the second indication information and the third indication information. In this case, the first signaling may be one or more pieces of signaling. In other words, the second indication information and the third indication information may be sent by using one piece of signaling, or may be sent by using different signaling. The terminal device can determine, based on the second indication information, a frequency-domain index of an SSB corresponding to the SIB1. Further, the terminal device can determine, based on the third indication information, a specific candidate SSB that is in the SSB pattern and that is actually sent or actually exists. Therefore, the terminal device determines a time-frequency resource of another existing SSB based on the frequency-domain index and an index of the actually sent SSB that is in the SSB pattern and that is indicated by the third indication information.

It should be noted that if the second indication information and the third indication information both exist, an SSB indicated by the second indication information and an SSB indicated by the third indication information may be SSBs that are not completely the same. For example, the second indication information indicates a frequency-domain index of a currently accessed SSB; and the third indication information indicates one or more actually sent SSBs in the SSB pattern, where the one or more actually sent SSBs include an SSB other than the currently accessed SSB; or the third indication information indicates the currently accessed SSB and another actually sent SSB.

For example, the second indication information indicates an index of the first SSB, and the third indication information indicates an index of another actually sent SSB in the SSB pattern. Certainly, the third indication information may further simultaneously indicate the first SSB and another actually sent SSB in the SSB pattern.

Optionally, the first signaling further includes first indication information. The first indication information may be the same as that described above.

It may be understood that when a plurality of indication fields exist, the first indication field, the second indication field, and the third indication field may be sent in different types of signaling, or may be sent in different SIB or RRC signaling, or may be sent in same SIB or RRC signaling. For example, the second indication field is in first SIB1 signaling, and the third indication field is in second SIB1 signaling. Alternatively, the RRC signaling simultaneously includes the first indication field, the second indication field, and the third indication field.

Optionally, one or more of the first indication field, the second indication field, and the third indication field may be sent by using a MIB.

Step 704: The terminal device receives the first synchronization signal/physical broadcast channel block or receives data based on the resource of the first SSB.

When the data is received, rate matching is performed based on the resource of the first SSB.

It may be understood that the performing rate matching based on the resource of the first SSB may mean that the terminal device does not receive data on the resource of the first SSB.

This step is an optional step.

Optionally, the operation of the terminal device in this step may be implemented by using the transceiver of the terminal device or implemented by controlling the transceiver by the processor of the terminal device. The transceiver may be the transceiver unit in the terminal device or the transceiver unit in the chip of the terminal device.

Optionally, the operation of the terminal device in this step may be implemented by using the processing chip of the network device or implemented by using the transceiver unit in the processing chip.

Optionally, the operation of the terminal device in this step may be implemented by using the processor of the terminal device. The processor may be the processing unit in the terminal device.

Optionally, the operation of the terminal device in this step may be implemented by using the processing chip of the terminal device or implemented by using the processing unit in the processing chip.

Step 705: The terminal device sends channel state information, and the network device receives the channel state information.

This step is an optional step.

Optionally, the operation of the terminal device in this step may be implemented by using the transceiver of the terminal device or implemented by controlling the transceiver by the processor of the terminal device. The transceiver may be the transceiver unit in the terminal device or the transceiver unit in the chip of the terminal device.

Optionally, the operation of the terminal device in this step may be implemented by using the processing chip of the network device or implemented by using the transceiver unit in the processing chip.

Optionally, the operation of the terminal device in this step may be implemented by using the processor of the terminal device. The processor may be the processing unit in the terminal device.

Optionally, the operation of the terminal device in this step may be implemented by using the processing chip of the terminal device or implemented by using the processing unit in the processing chip.

Optionally, the operation of the network device in this step may be implemented by using the transceiver of the network device or implemented by controlling the transceiver by the processor of the network device. The transceiver may be the transceiver unit in the network device or the transceiver unit in the chip of the network device.

Optionally, the operation of the network device in this step may be implemented by using the processing chip of the network device or implemented by using the transceiver unit in the processing chip.

The channel state information includes a time-domain index and a frequency-domain index of at least one SSB in the at least two candidate SSBs and/or channel quality information corresponding to at least one SSB in the at least two candidate SSBs; or the channel state information includes an index of at least one SSB in the at least two candidate SSBs.

It should be noted that in this embodiment, the channel state information may include the time-domain index and the frequency-domain index of the at least one SSB in the at least two candidate SSBs, and does not include the channel quality information corresponding to the at least one SSB. In this way, the terminal device may send, to the network device, only the index of the at least one SSB selected by the terminal device or only the frequency-domain index and the time-domain index of the at least one SSB selected by the terminal device, and report the channel quality information by reporting an index.

In the foregoing embodiment, there are at least two candidate SSBs, and the two candidate SSBs are respectively located at least two frequencies in a single serving cell or a single bandwidth part in a frequency division multiplexing manner, to provide a possibility of sending a synchronization signal/physical broadcast channel block in a frequency division multiplexing manner. In this manner, efficiency of sending an SSB in frequency domain can be improved. Because a plurality of SSBs may exist in frequency domain, the terminal device may quickly receive the SSB in frequency domain, which provides a possibility for the terminal device to quickly detect the SSB.

It may be understood that no all the foregoing steps in this embodiment of this application need to be performed. For example, all or some of the foregoing steps may be performed. For example, steps 701 and 702 are performed, at least one of steps 703 to 705 is performed, and a step other than the indicated step in the steps 703 to 705 is not performed.

Optionally, the SIB1 or RRC signaling includes a first indication field. The first indication field indicates that a multiplexing manner of the SSB is one of FDM or TDM; or the first indication field indicates a quantity of frequencies on which the SSB is sent, or the first indication field indicates a frequency on which the SSB is sent; or the first indication field indicates a pattern for sending the SSB, for example, indicates one of a plurality of predefined patterns. The first indication field may be the same as that described in the foregoing embodiment.

Optionally, the SIB1 includes a second indication field, and the second indication field indicates a frequency-domain index that is of an SSB corresponding to the SIB1 and that is in the SSB pattern or a frequency-domain index of a current SSB. A frequency of the SSB corresponding to the SIB1 may be obtained through initial access. The second indication field may be the same as that described in the foregoing embodiment.

For example, the network device indicates the frequency of the SSB by using the following absoluteFrequencySSB field in the RRC signaling:

```
FrequencyInfoDL ::=                SEQUENCE {
  absoluteFrequencySSB               ARFCN-ValueNR
OPTIONAL, -- Cond SpCellAdd
  frequencyBandList                  MultiFrequencyBandListNR,
  absoluteFrequencyPointA            ARFCN-ValueNR,
  scs-SpecificCarrierList            SEQUENCE (SIZE (1..maxSCSs))
OF SCS-SpecificCarrier,
  ...
}
```

An embodiment further provides an example of a communications method to which the foregoing SSB pattern and resource indication manner are applied. The method includes the following steps (not shown in the figure). In this example, an SSB is sent in an FDM manner.

Step S801: A network device sends an SSB in an FDM manner in a specific serving cell or on a specific carrier.

To be specific, in a single serving cell or on a single carrier, the network device sends the SSB at a plurality of frequencies on a same time-domain resource.

An SSB pattern may be shown in FIG. 4A and FIG. 4B or may be another pattern.

Optionally, a PBCH DMRS and/or a MIB in the foregoing SSB indicate/indicates only a time-domain index of the SSB but not a frequency-domain index. In other words, for SSBs at a same time-domain location and different frequency-domain locations, indexes that are of the SSBs and that are indicated by the PBCH DMRS or the MIB are the same.

S802: During initial access, a terminal device scans the SSB on a GSCN grid.

After detecting the SSB, the terminal device obtains an index of the SSB based on the PBCH DMRS or PBCH DMRS and MIB information, and completes slot-level synchronization based on the SSB index and the SSB pattern.

S803: The network device sends, in MIB information of the SSB, information about a CORESET #0; sends, in the CORESET #0, a PDCCH used to schedule a SIB1; and sends the SIB1 on a resource indicated by the PDCCH, where the SIB1 indicates an actually sent SSB.

If the SSB is sent in an FDM manner, one or more of the following indication fields are added to SIB1 or RRC signaling to indicate a time-frequency resource of an actually sent SSB.

Optionally, if the first indication field indicates that the SSB is sent through FDM, the SIB1 or RRC signaling may further include a third indication field. The third indication field indicates an index of the SSB in FDM. The third indication field may be the same as that described in the foregoing embodiment.

It may be understood that when a plurality of indication fields exist, the first indication field, the second indication field, and the third indication field may be sent in different types of signaling, or may be sent in different SIB or RRC signaling, or may be sent in same SIB or RRC signaling. For example, the second indication field is in first SIB1 signaling, and the third indication field is in second SIB1 signaling. Alternatively, the RRC signaling simultaneously includes the first indication field, the second indication field, and the third indication field.

S804: UE receives MIB information corresponding to an SSB identified in S002 and/or MIB information corresponding to another SSB, obtains the information about the CORESET #0, and receives, in the CORESET #0, the PDCCH for scheduling the SIB1, where the SIB1 indicates a time-frequency resource of an actually sent SSB.

After detecting the SSB through frequency scanning, the terminal device accesses the network device (that is, learns of an absolute frequency-domain location of an accessed SSB); learns, by using a PBCH DMRS in the SSB or the PBCH DMRS and a MIB, a time-domain location of a currently accessed SSB; and learns, by using the second indication information, a relative frequency-domain location that is of an SSB that currently accesses a frequency and that is in the SSB pattern. Because a frequency-domain interval and a time-domain interval between actually sent SSBs in the SSB pattern are known, absolute frequency-domain locations and time-domain locations of all SSBs in the SSB pattern that may be sent may be learned of.

S005: The network device indicates, by using the RRC signaling, a time-frequency resource of an SSB used for BM measurement or RRM measurement.

The network device may indicate a time-frequency resource of an SSB in the following two methods (as shown in FIG. 5).

Method 1: The network device configures a time-domain index and a frequency-domain index (applicable to RRM measurement) of an SSB used for BM measurement. For example, during resource configuration, the network device indicates that a time-domain index of an SSB is i and a frequency-domain index of the SSB is j, as shown in FIG. 5.

Method 2: The network device configures an index of an SSB, where the index of the SSB is an absolute index including a time-domain index and a frequency-domain index.

For example, it is assumed that there are N SSBs in time division multiplexing, a time-domain index of an SSB is i, and a frequency-domain index of the SSB is j. In this case, an absolute index of the SSB is that the SSB index=N*j+i, as shown in FIG. 2 and FIG. 3.

S006: The terminal device receives the RRC signaling, where the RRC signaling indicates the time-frequency resource of the SSB used for BM measurement or RRM measurement.

S007: The terminal device measures the time-frequency resource that is of the SSB and that is obtained in S006, and reports a measurement result to the network device, where the measurement result includes an index of the SSB and channel quality information of the SSB.

The terminal device may report the index of the SSB in the following two methods.

Method 1: The terminal device reports a time-domain index and a frequency-domain index of the SSB, as shown in FIG. 5.

Method 2: The terminal device reports an absolute index of the SSB. For example, it is assumed that there are N SSBs in time division multiplexing, a time-domain index of an SSB is i, and a frequency-domain index of the SSB is j. In this case, the absolute index of the SSB is that the SSB index=N*j+i, as shown in FIG. 6.

In this embodiment of the present invention, the following problems can be resolved: How to indicate a time-frequency resource of an FDM SSB when an SSB is sent in an FDM manner, so that the UE can complete slot-level synchronization based on indication information, and how to report a channel quality measurement result based on the indicated time-frequency resource of the FDM SSB. In addition, the SSB is transmitted in an FDM manner, so that energy saving efficiency of a base station can be improved through symbol-level power-off.

An example of the present invention further provides a communications apparatus. The communications apparatus may be, for example, an integrated circuit, a wireless device, a circuit module, or the like, and is configured to implement the foregoing method. An apparatus for implementing a power tracker and/or a power supply generator described in this specification may be a self-supporting device or may be a part of a relatively large device. The device may be: (i) a self-supporting IC; (ii) a set including one or more ICs, which may include a memory IC configured to store data and/or instructions; (iii) an RFIC, such as an RF receiver or an RF transmitter/receiver; (iv) an ASIC, such as mobile station modem; (v) a module that can be embedded in another device; (vi) a receiver, a cellular phone, a wireless device, a handheld set, or a mobile unit; or (vii) another device.

The method and the apparatus provided in the embodiments of the present invention may be applied to the terminal device or an access network device (which may be collectively referred to as the network device) provided in FIG. 2. The terminal device, the access network device, or a wireless device may include a hardware layer, an operating system layer that runs above the hardware layer, and an application layer that runs above the operating system layer. The hardware layer includes hardware such as a central processing unit (CPU), a memory management unit (MMU), and a memory (also referred to as a main memory). The operating system may be any one or more types of computer operating systems that implement service processing through a process, for example, a Linux operating system, a Unix operating system, an Android operating system, an iOS operating system, or a Windows operating system. The application layer includes applications such as a browser, an address book, word processing software, and instant messaging software. In addition, a specific structure of an execution body of the method is not specially limited in the embodiments of the present invention, provided that the execution body can run a program that records code of the method in the embodiments of the present invention, to perform communication based on the signal transmission method in the embodiments of the present invention. For example, the execution body of the wireless communications method in the embodiments of the present invention may be the terminal device or the access network device, or may be a functional module that is in the terminal device or the access network device and that can invoke a program and execute the program.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the embodiments of the present invention.

In addition, aspects or features in the embodiments of the present invention may be implemented as a method, an apparatus or a product that uses standard programming and/or engineering technologies. The term "product" used in this application covers a computer program that can be accessed from any computer-readable component, carrier or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card and a flash memory component (for example, erasable programmable read-only memory (erasable programmable read-only memory, EPROM), a card, a stick, or a key drive). In addition, various storage media described in this specification may represent one or more devices and/or other machine-readable media used to store information. The term "machine readable media" may include but is not limited to a radio channel, and various other media that can store, contain and/or carry instructions and/or data.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedure or functions according to the embodiments of the present invention are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, a solid-state drive Solid-State Disk (SSD)), or the like.

It should be understood that sequence numbers of the foregoing processes do not mean execution sequences in various embodiments of the present invention. The execution sequences of the processes should be determined according to functions and internal logic of the processes, and should not be construed as any limitation on the implementation processes of the embodiments of the present invention.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communications connections may be implemented by using some interfaces. The indirect couplings or communications connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected based on actual requirements to achieve the objectives of the solutions of the embodiments.

When the functions are implemented in the form of a software functional unit and sold or used as an independent product, the functions may be stored in a computer-readable storage medium. Based on such an understanding, the technical solutions of the embodiments of the present invention essentially, or the part contributing to the conventional technology, or some of the technical solutions may be implemented in a form of a software product. The computer software product is stored in a storage medium, and includes several instructions for instructing a computer device (which may be a personal computer, a server, or an access network device) to perform all or some of the steps of the methods described in the embodiments of the present invention. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of the embodiments of the present invention, but are not intended to limit the protection scope of the embodiments of the present invention. Any variation or replacement readily figured out by a person skilled in the art within the technical scope disclosed in the embodiments of the present invention shall fall within the protection scope of the embodiments of the present invention.

What is claimed is:

1. A communication method, comprising:
sending a first synchronization signal/physical broadcast channel block on a first resource of resources corresponding to at least two candidate synchronization signal/physical broadcast channel blocks, wherein the at least two candidate synchronization signal/physical broadcast channel blocks are respectively simultaneously located at least two frequencies in a single serving cell or a single bandwidth part in a frequency division multiplexing manner;
sending resource information of the first synchronization signal/physical broadcast channel block; and
receiving channel state information, wherein:
the channel state information comprises an index of a synchronization signal/physical broadcast channel block of the at least two candidate synchronization signal/physical broadcast channel blocks, and the index of the synchronization signal/physical broadcast channel block represents a plurality of synchronization signal/physical broadcast channel blocks of a synchronization signal/physical broadcast channel block pattern sorted in a sequence of time domain followed by frequency domain.

2. The method according to claim 1, wherein the resource information of the first synchronization signal/physical broadcast channel block comprises second indication information, wherein:
the second indication information indicates a frequency-domain index of the first synchronization signal/physical broadcast channel block.

3. The method according to claim 1, wherein
the resource information of the first synchronization signal/physical broadcast channel block comprises third indication information, wherein
the third indication information indicates a frequency-domain resource of the first synchronization signal/physical broadcast channel block of the at least two candidate synchronization signal/physical broadcast channel blocks.

4. The method according to claim 1, further comprising:
sending first indication information, wherein
the first indication information indicates whether to send the synchronization signal/physical broadcast channel block in the frequency division multiplexing manner; or
the first indication information indicates the at least two frequencies.

5. The method according to claim 1, wherein:
the channel state information comprises a time-domain index and a frequency-domain index of the synchronization signal/physical broadcast channel block of the at least two candidate synchronization signal/physical broadcast channel blocks.

6. The method according to claim 1, wherein the resource information of the first synchronization signal/physical broadcast channel block comprises:
a time-domain index and a frequency-domain index of the first synchronization signal/physical broadcast channel block.

7. The method according to claim 1, wherein the sending resource information of the first synchronization signal/physical broadcast channel block comprises:
sending a time-domain index of the first synchronization signal/physical broadcast channel block by using a broadcast channel demodulation reference signal and/or a master information block.

8. A communication method, comprising:
receiving resource information of a first synchronization signal/physical broadcast channel block, wherein the first synchronization signal/physical broadcast channel block belongs to at least two candidate synchronization signal/physical broadcast channel blocks, and the at least two candidate synchronization signal/physical broadcast channel blocks are respectively simultaneously located at least two frequencies in a single serving cell or a single bandwidth part in a frequency division multiplexing manner; and
determining a resource of the first synchronization signal/physical broadcast channel block based on the resource information, wherein:
time domain resources occupied by the at least two candidate synchronization signal/physical broadcast channel blocks completely or partially overlap; or
the at least two candidate synchronization signal/physical broadcast channel blocks have a same sending period or the at least two candidate synchronization signal/physical broadcast channel blocks correspond to a same subcarrier spacing; or
the at least two frequencies are located on a global synchronization channel number (GSCN) grid.

9. The method according to claim 8, wherein the resource information of the first synchronization signal/physical broadcast channel block comprises second indication information, wherein:
the second indication information indicates a frequency-domain index of a synchronization signal/physical broadcast channel block pattern of the first synchronization signal/physical broadcast channel block associated with a system information block type 1; or
the second indication information indicates a frequency-domain index of the first synchronization signal/physical broadcast channel block.

10. The method according to claim 8, wherein the resource information of the first synchronization signal/physical broadcast channel block comprises third indication information, wherein the third indication information indicates a frequency-domain resource of the first synchronization signal/physical broadcast channel block in the at least two candidate synchronization signal/physical broadcast channel blocks; or
the third indication information comprises a bitmap, wherein each bit of the bitmap corresponds to a candidate synchronization signal/physical broadcast channel block of the at least two candidate synchronization signal/physical broadcast channel blocks, and each bit indicates whether the corresponding synchronization signal/physical broadcast channel block exists.

11. The method according to claim 8, further comprising:
receiving first indication information, wherein the first indication information indicates that the at least two candidate synchronization signal/physical broadcast channel blocks are frequency division multiplexed; or
the first indication information indicates a quantity of frequencies in the at least two frequencies; or
the first indication information indicates the at least two frequencies; or
the first indication information indicates a synchronization signal/physical broadcast channel block pattern.

12. The method according to claim 8, wherein the method further comprises: receiving channel state information, wherein
the channel state information comprises a time-domain index and a frequency-domain index of a synchronization signal/physical broadcast channel block in the at least two candidate synchronization signal/physical broadcast channel blocks; or
the channel state information comprises an index of the synchronization signal/physical broadcast channel block of the at least two candidate synchronization signal/physical broadcast channel blocks, and the index of the synchronization signal/physical broadcast channel block represents a plurality of synchronization signal/physical broadcast channel blocks of a synchronization signal/physical broadcast channel block pattern sorted in a sequence of time domain followed by frequency domain.

13. The method according to claim 8, wherein
the resource information of the first synchronization signal/physical broadcast channel block is a time-domain index and a frequency-domain index of the first synchronization signal/physical broadcast channel block; or
the resource information of the first synchronization signal/physical broadcast channel block is an index of the first synchronization signal/physical broadcast channel block, the index of the first synchronization signal/physical broadcast channel block represents a plurality of synchronization signal/physical broadcast channel blocks of a synchronization signal/physical broadcast channel block pattern sorted in a sequence of first time domain followed by frequency domain.

14. The method according to claim 8, wherein
receiving the resource information of the first synchronization signal/physical broadcast channel block comprises:
receiving a time-domain index of the first synchronization signal/physical broadcast channel block using a broadcast channel demodulation reference signal and/or a master information block.

15. The method according to claim 8, wherein
a frequency interval between the at least two frequencies is a predefined value, or information about the frequency interval between the at least two frequencies is received via first signaling, wherein the first signaling comprises master information block signaling, system information block signaling, or radio resource control (RRC) signaling.

16. The method according to claim 8, wherein
a minimum band of the single serving cell or a serving cell to which the bandwidth part belongs is an n79 band of 40 MHz; or in the single serving cell or the serving cell to which the bandwidth part belongs, a data channel has subcarrier spacing of 30 kHz and supports a minimum bandwidth of 10 MHz, a synchronization signal/physical broadcast channel block subcarrier spacing is 15 kHz, and a band of the single serving cell or the serving cell to which the bandwidth part belongs is one or more of operating bands n1, n2, n3, n5, n7, n8, n12, n14, n18, n20, n25, n28, n29, n30, n34, n38, n39, n40, n41, n48, n50, n65, n66, n70, n71, n74, n75, n77, n78, n80, n81, n82, n83, n84, n86, or n89; or in the single serving cell or the serving cell to which the bandwidth part belongs, the data channel has subcarrier spacing of 15 kHz and supports a minimum bandwidth of 10 MHz, the synchronization signal/physical broadcast channel block subcarrier spacing is 15 kHz, and an applicable band is one or more of n41, n77, n78, or n90.

17. An apparatus, comprising: a processor; and
a memory coupled to the processor with instructions stored thereon, wherein when the instructions are executed by the processor, the apparatus is configured to:
receive resource information of a first synchronization signal/physical broadcast channel block, wherein the first synchronization signal/physical broadcast channel block belongs to at least two candidate synchronization signal/physical broadcast channel blocks, and the at least two candidate synchronization signal/physical broadcast channel blocks are respectively simultaneously located at least two frequencies in a single serving cell or a single bandwidth part in a frequency division multiplexing manner; and
determine a resource of the first synchronization signal/physical broadcast channel block based on the resource information, wherein:
time domain resources occupied by the at least two candidate synchronization signal/physical broadcast channel blocks completely or partially overlap; or
the at least two candidate synchronization signal/physical broadcast channel blocks have a same sending period or the at least two candidate synchronization signal/physical broadcast channel blocks correspond to a same subcarrier spacing; or
the at least two frequencies are located on a global synchronization channel number (GSCN) grid.

18. The apparatus according to claim 17, wherein the resource information of the first synchronization signal/physical broadcast channel block comprises second indication information, wherein
the second indication information indicates a frequency-domain index of a synchronization signal/physical broadcast channel block pattern of the first synchronization signal/physical broadcast channel block associated with a system information block type 1; or
the second indication information indicates a frequency-domain index of the first synchronization signal/physical broadcast channel block.

19. The apparatus according to claim 17, wherein the resource information of the first synchronization signal/physical broadcast channel block comprises third indication information, wherein
the third indication information indicates a frequency-domain resource of the first synchronization signal/physical broadcast channel block in the at least two candidate synchronization signal/physical broadcast channel blocks; or
the third indication information comprises a bitmap, wherein each bit of the bitmap corresponds to a candidate synchronization signal/physical broadcast channel block of the at least two candidate synchronization signal/physical broadcast channel blocks, and each bit indicates whether the corresponding synchronization signal/physical broadcast channel block exists.

20. The method according to claim 1, wherein the resource information of the first synchronization signal/physical broadcast channel block comprises second indication information, wherein:
the second indication information indicates a frequency-domain index of a synchronization signal/physical broadcast channel block pattern of the first synchronization signal/physical broadcast channel block associated with a system information block type 1.

21. The method according to claim 1, wherein:
the resource information of the first synchronization signal/physical broadcast channel block comprises third indication information; and
the third indication information comprises a bitmap, wherein each bit of the bitmap corresponds to a candidate synchronization signal/physical broadcast channel block of the at least two candidate synchronization signal/physical broadcast channel blocks, and each bit indicates whether to send the corresponding synchronization signal/physical broadcast channel block.

22. The method according to claim 1, further comprising:
sending first indication information, wherein the first indication information indicates a quantity of frequencies in the at least two frequencies; or
the first indication information indicates a synchronization signal/physical broadcast channel block pattern.

23. The method according to claim 1, wherein the resource information of the first synchronization signal/physical broadcast channel block comprises:
an index of the first synchronization signal/physical broadcast channel block, wherein the index of the first synchronization signal/physical broadcast channel block represents a plurality of synchronization signal/physical broadcast channel blocks of a synchronization signal/physical broadcast channel block pattern sorted in a sequence of time domain followed by frequency domain.

* * * * *